(12) United States Patent
Walker et al.

(10) Patent No.: US 6,418,415 B1
(45) Date of Patent: Jul. 9, 2002

(54) SYSTEM AND METHOD FOR AGGREGATING MULTIPLE BUYERS UTILIZING CONDITIONAL PURCHASE OFFERS (CPOS)

(75) Inventors: Jay S. Walker, Ridgefield; Daniel E. Tedesco, Monroe; James A. Jorasch, Stamford, all of CT (US)

(73) Assignee: priceline.com Incorporated, Stamford, CT (US)

( * ) Notice: Subject to any disclaimer, the term of this patent is extended or adjusted under 35 U.S.C. 154(b) by 0 days.

(21) Appl. No.: 08/943,266

(22) Filed: Oct. 3, 1997

Related U.S. Application Data

(63) Continuation-in-part of application No. 08/889,319, filed on Jul. 8, 1997, which is a continuation-in-part of application No. 08/707,660, filed on Sep. 4, 1996, now Pat. No. 5,794,207.

(51) Int. Cl.[7] .............................................. G06F 17/00
(52) U.S. Cl. .......................................... 705/26; 705/27
(58) Field of Search ............................ 705/80, 26, 27, 705/30, 37

(56) References Cited

U.S. PATENT DOCUMENTS

| | | | | |
|---|---|---|---|---|
| 3,573,747 A | * | 4/1971 | Adams et al. |
| 4,247,759 A | * | 1/1981 | Yuris et al. |
| 4,449,186 A | * | 5/1984 | Kelly et al. |
| 4,553,222 A | * | 11/1985 | Kurland et al. |
| 4,677,552 A | * | 6/1987 | Sibley, Jr. |
| 4,751,728 A | * | 6/1988 | Treat |

(List continued on next page.)

FOREIGN PATENT DOCUMENTS

| WO | 96/34356 | * | 10/1996 |
| WO | 97/46961 | * | 12/1997 |

OTHER PUBLICATIONS

Adam Bryant, Shaking Up Air Fares' Status Quo, The New York Times, Mar. 31, 1997.*
CyberBid, Net Fun Ltd. (1996).*
Laura Del Rosso, Marketel Says It Plans to Launch Air Fare 'Auction' in Jun.; Marketel International, Inc., Travel Weekly, Apr. 29, 1991, at 1.*

(List continued on next page.)

*Primary Examiner*—Thomas R. Peeso
(74) *Attorney, Agent, or Firm*—Morgan & Finnegan, L.L.P.; Jeffrey L. Brandt

(57) ABSTRACT

An aggregate conditional purchase offer (CPO) management system for receiving and processing CPOs from buyers for one or more goods or services is disclosed. Received CPOs are processed to determine whether the CPO should be provided to sellers individually and/or collectively as part of an aggregate CPO. If a CPO is accepted individually, or collectively as part of an aggregate CPO, the buyer is bound on behalf of the accepting seller. CPOs are administered on behalf of groups of buyers to form aggregate CPOs which are offered to sellers. Groups are preferably formed dynamically in accordance with predefined aggregation rules. The unit price associated with an aggregate CPO may be an average of the individual CPO prices for each CPO included in the aggregate CPO. Alternatively, the aggregate CPO price may be the total of the individual CPO prices for each CPO included in the aggregate CPO. The aggregation rules can optionally require that the terms of an individual CPO, including price, be within predefined tolerances of the terms of an aggregate CPO or one or more pending individual CPOs, in order for the individual CPO to be included in the buyer can request to include the new CPO in one or more existing aggregate CPOs. Buyers may be requested to modify the original terms of a CPO to conform the terms to an existing aggregate CPO or one or more pending individual CPOs, so that the modified CPO can be included with the pending aggregate CPO or the pending individual CPOs to form a new aggregate CPO.

32 Claims, 18 Drawing Sheets

U.S. PATENT DOCUMENTS

| | | | | |
|---|---|---|---|---|
| 4,789,928 | A | * | 12/1988 | Fujisaki |
| 4,799,156 | A | * | 1/1989 | Shavit et al. |
| 4,903,201 | A | * | 2/1990 | Wagner |
| 4,931,932 | A | * | 6/1990 | Dalnekoff et al. |
| 5,021,953 | A | * | 6/1991 | Webber et al. |
| 5,136,501 | A | * | 8/1992 | Silverman et al. |
| 5,168,446 | A | * | 12/1992 | Wiseman |
| 5,191,523 | A | * | 3/1993 | Whitesage |
| 5,191,613 | A | * | 3/1993 | Graziano et al. |
| 5,224,034 | A | * | 6/1993 | Katz et al. |
| 5,243,515 | A | * | 9/1993 | Lee |
| 5,253,165 | A | * | 10/1993 | Leiseca et al. |
| 5,262,941 | A | * | 11/1993 | Saladin et al. |
| 5,283,731 | A | * | 2/1994 | Lalonde et al. |
| 5,297,031 | A | * | 3/1994 | Gutterman et al. |
| 5,329,589 | A | * | 7/1994 | Fraser et al. |
| 5,361,199 | A | * | 11/1994 | Shoquist et al. |
| 5,404,291 | A | * | 4/1995 | Kerr et al. |
| 5,420,914 | A | * | 5/1995 | Blumhardt |
| 5,426,281 | A | * | 6/1995 | Abecassis |
| 5,444,630 | A | * | 8/1995 | Dlugos |
| 5,467,269 | A | * | 11/1995 | Flaten |
| 5,500,793 | A | * | 3/1996 | Deming, Jr. et al. |
| 5,517,555 | A | * | 5/1996 | Amadon et al. |
| 5,519,769 | A | * | 5/1996 | Weinberger et al. |
| 5,553,131 | A | * | 9/1996 | Minervino, Jr. et al. |
| 5,557,517 | A | * | 9/1996 | Daughterty, III |
| 5,557,518 | A | * | 9/1996 | Rosen |
| 5,570,283 | A | * | 10/1996 | Shoolery et al. |
| 5,592,375 | A | * | 1/1997 | Salmon et al. |
| 5,606,602 | A | * | 2/1997 | Johnson et al. |
| 5,611,052 | A | * | 3/1997 | Dykstra et al. |
| 5,615,269 | A | * | 3/1997 | Micali |
| 5,664,115 | A | * | 9/1997 | Fraser |
| 5,689,652 | A | * | 11/1997 | Lupien et al. |
| 5,694,551 | A | * | 12/1997 | Doyle et al. |
| 5,696,965 | A | * | 12/1997 | Dedrick |
| 5,717,989 | A | * | 2/1998 | Tozzoli et al. |
| 5,732,400 | A | * | 3/1998 | Mandler et al. |
| 5,745,882 | A | * | 4/1998 | Bixler et al. |
| 5,757,917 | A | * | 5/1998 | Rose et al. |
| 5,758,328 | A | * | 5/1998 | Giovannoli |
| 5,794,207 | A | * | 8/1998 | Walker et al. |
| 5,794,219 | A | * | 8/1998 | Brown |
| 5,797,127 | A | * | 8/1998 | Walker et al. |
| 5,799,285 | A | * | 8/1998 | Klingman |
| 5,826,244 | A | * | 10/1998 | Huberman |
| 5,832,452 | A | * | 11/1998 | Schneider et al. |
| 5,835,896 | A | * | 11/1998 | Fisher et al. |
| 5,845,265 | A | * | 12/1998 | Woolston |

OTHER PUBLICATIONS

Laura Del Rosso, Ticket–Bidding Firm Closes its Doors; Marketel International, Inc., Travel Weekly, Mar. 12, 1992, at 1.*

Fran Golden, AAL'S Riga Doubts Marketel's Appeal to Retailers; Chris Riga of American Airlines, Travel Weekly, Nov. 13, 1989, at 4.*

Robert Kuttner, Computers May Turn the World Into One Big Commodities Pit, Business Week, Sep. 11, 1989, at 17.*

Jeff Pelline, Travelers Bidding on Airline Tickets; SF Firm Offers Chance for Cut Rate Fares, The San Francisco Chronicle, Aug. 19, 1991, (News) at A4.*

J. Kelsey and B. Schneier, Conditional Purchase Orders, 4th ACM Conference on Computer and Communications Security, ACM Press, 117–124 (Apr. 1997).*

Michael Schrage, An Experiment In Economic Theory; Labs Testing Real Markets, The Record, Nov. 26, 1989, (Business) at B01.*

The United Computer Exchange: How It All Works, selected pages downloaded from www.uce.com on Jul. 23, 1997.*

Fishkin, Ken, Foresight Exchange Tutorial: (http://www.ideosphere.com/fx/docs/tutorial.html) Feb. 19, 1999 at p. 1–5.*

"Bid.com 1998 Third–Quarter Revenue Increases 12.5 Percent From Second Quarter", Business Wire, Oct. 29, 1998.*

Final Report: Virtual Hospital (http://www..telemed.medadmin.uiowa.edu/TRCDocs/Pubs/FinalReport/cVirtualH/virtualH/virtual h02.html), download date: Sep. 20, 1998.*

"First Source Become a Member", More Reasons To Join First Source! (http://www.fsource.com/bene.html), download date: Sep. 20, 1998.*

Jeffrey Davis, "Big Storm rising", Business 2.0, Sep., 1998 at p. 60.*

Suite 101.com (http://www.suite101.com/doc.cfm.presskit/questions), 1998.*

Web Marketing Today (http://www.wilsonweb.com/rfwilson/wmt2/issue36htm) dated Sep. 1, 1997, download date: Sep. 17, 1998.*

"Free Stuff Internet Site Delivers for Viewers and Advertisers Alike", Press Release of PromoNet Interactive, Inc. dated Nov. 10, 1997.*

About Iao, selected pages downloaded from www.iaoauction.com on Sep. 8, 1997 and Sep. 18, 1997.*

Onsale: Auction Supersite, selected pages downloaded from www.onsale.com on Sep. 8, 1997.*

Hapgood, Fred 'bidder Harvest', Sep. 1997, p. 58.*

NASDAQ: What is NASDAQ?, selected pages downloaded from http://home.axford.com on Aug. 15, 1997.*

NASDAQ Consolidated Subscriber Agreement, downloaded from www.pcquote.com/exchanges on Aug. 15, 1997.*

TradingFloor: General Trading Information and Terms, downloaded from www.tradingfloor.com on Aug. 14, 1997.*

HomeShark: Refinance Check, selected pages downloaded from www.homeshark.com on Aug. 13, 1997.*

The Loan Process, downloaded form www.sdtech.com/mls/process on Aug. 7, 1997.*

Trade–Direct: We Help You Trade With Confidence, selected pages downloaded from www.trade–direct.com on Aug. 6, 1997.*

Classifieds2000: The Internet Classifieds, selected pages downloaded from www.classifieds2000.com on Aug. 6, 1997.*

Internet Mortgage Service Eliminates Loan Agents and Passes Commissions on to the Consumer, Company Press Release, Yahoo Business Wire (Jun. 30, 1997).*

Frequently Asked Questions About: Airhitch, selected pages downloaded from www.isicom.com.fr/airhitch on May 6, 1997.*

Hitch a Flight to Europe, selected pages downloaded from www.travelassist.com on May 6, 1997.*

Airhitch: Your Way to Low Cost Travel, selected pages downloaded from www.vaportrails.com on May 6, 1997.*

Kelsey, J. and Schneier, B., Conditional Purchase Orders, $4^{th}$ ACM Conference on Computer and Communications Security , ACM Press, 117–124 (Apr. 1997).*

Bryant, Adam, "Shaking Up Air Fares' Status Quo", The New York Times, Mar. 31, 1997.*

Silverman, Robert, "GM Drives Wed Ad Insertion Network", Inside Media, Feb. 26, 1997, vol. 9, No. 4, p. 1; ISSN:1046–5316.*

"Flycast Introduces Unique 'Open Exchange' Match–Making Service", Interactive Marketing News, Feb. 21, 1997, vol. 4, No. 8.*

"UK's World Telecom Unveils New WorldSaver Tariffs," Newsbytes, Information Access Company (Feb. 13, 1997).*

"TransQuest and Web Ventures Deliver Internet Booking for Delta Air Lines", PR Newswire, Dec. 10, 1996, Financial News Section.*

"Affinicast Enables Web Sites That Listen and Adapt to Customer Affinities", PR Newswire, Dec. 3, 1996.*

"Web Ventures Presents BookIt!" press release printed from http://www/webventures.com/bookit/(Web Ventures World Wide Web site) on Dec. 2, 1996.*

"World's First Real–Time Travel Auction Service to Be Available Via World Wide Web: ETA To Open Bidding to Consumers," Business Wire, Dialog Trade & Industry Database, (Nov. 4, 1996).*

Gessel, Chris, "Trade Smarter: The Limit of Orders", Investor's Business Daily, Oct. 14, 1996, p. A1.*

Crest: Cruise/Ferry Revenue Management System, selected pages downloaded from www.rtscorp.com on Aug. 5, 1996.*

Nishimoto, Lisa, "Travel Services Are First Online Commerce Offerings to Fly," Infoworld, Jul. 29, 1996, downloaded from http://www.infoworld.com.*

About Rate Hunter, dowloaded from http://207.49.64.77/rhprodrh.htm on Jul. 14, 1996.*

Cathay Pacific Online Ticket Bidding, World Internet News Digest (May 8, 1996).*

Sothbey's General Information, downloaded from www.sothebys.com (1996).*

CyberBid, Net Fun Ltd.(1996).*

Nimmer, Raymond, T., "Electronic Contracting; Legal Issues", 14 J. Marshall J. Computer & Info L.211, Winter, 1996.*

American Law Institute, Draft–Uniform Commercial Code Revised Article 2 (Sales), parts 2, 3, and 7, pp. 1–15, Jan. 4, 1996.*

Speidel, Richard E. & Schott, Lee A., "Impact of Electronic Contracting on Contract Formation Under Revised UCC Article 2, Sales", C878 ALI–ABA 335, Dec. 9, 1993.*

Hainer, Cathy and Grossman,Cathy Lynn, "Where Vacationing Kids Get Good Care", USA Today, Apr. 1,1992, at p. 4D.*

Del Russo, Laura, "Ticket–Bidding Firm Closes Its Door," Travel Weekly, Mar. 12, 1992.*

"Newsletters", The Atlanta Constitution, Mar. 1, 1992, p. K13.*

"CRTL's Blue Ribbon Deals for 1992", Consumer Reports Travel Letter, Jan. 1992, vol. 8, No. 1, at pp. 3–5.*

Traveler's Notes; Bookit Report, Consumer Reports Travel Letter, Dec. 1991 at p. 143.*

Feldman, Joan M., "To Rein In Those CRSs; Computer Reservation Systems", Air Transport World, Dec. 1991, at p. 89.*

"Money Briefs; Buy Low, Fly High", Gannet News Service, Nov. 20, 1991.*

"Buy Low, Fly High", USA Today, Nov. 14, 1991 at p. 15.*

Traveler's Notes; Easier Airfare Bidding, Consumer Reports Travel Letter, Oct. 1991 at p. 119.*

Nelson, Janet "Practical Traveler; Airlines Relaxing Policy on No–Refund Tickets", The New York Times, Sep. 22, 1991 at p. 3 of Section 5.*

Pelline, Jeff, "New Service; Now You Can Make a Bid on Your Next Airline Ticket Home", The Orange County Register, Sep. 1, 1991 at p. E01.*

"Bookit Airfare Bidding System (Fax for Your Plane Ticket?)", Consumer Reports Travel Letter, Sep. 1991, pp. 97 & 106.*

Upton, Kim "French Say Monoliths Off–limits to Visitors", Los Angeles Times, Aug. 25, 1991.*

Pelline, Jeff, "Travelers Bidding on Airline Tickets; SF Firm Offers Chance for Cut–Rate Fares", San Francisco Chronicle, Section A4, Aug. 19, 1991.*

Carey, Christopher, "Firm Offers Auction For Airline Tickets", St. Louis Post–Dispatch, Aug. 7, 1991 at p. 1B.*

Del Rosso, Laura, "Marketel Says It Plans to Launch Air Fare 'Auction' in Jun.", Travel Weekly, Apr. 29, 1991.*

NASDAQ Adds Enhancements to SOES Limit Order File, Securities Week, Nov. 26, 1990, p. 5.*

Ritter, Jeffrey B., "Scope of the Uniform Commercial Code: Computer Contracting Cases and Electrical Commercial Practices", 45 Bus. Law 2533, Aug., 1990.*

Greenburg, Peter, S., "Judging DeRegulation", The Record, Jul. 22, 1990 at p. T01.*

Greenburg, Peter, S., "The Savvy Traveler: Lower Air Fares for Consumers Not in the Cards; Airlines: Remember When It Cost $16 to fly From Los Angeles to San Francisco? Then You Remember the Days Before DeRegulation. Since Then, Prices Have Soared", Los Angeles Times, Jul. 8, 1990 at p. L2.*

Wallace, David, "Company Planning to Let Fliers Bid on Airfares", Philadelphia Business Journal, Mar. 26, 1990 at p. 15.*

"Letter to Business Extra", The San Francisco Chronicle, Dec. 26, 1989 at p. C7.*

Schrage, Micheal, "An Experiment in Economic Theory; Labs Testing Real Markets", The Record Section B1, Nov. 26, 1989.*

Schrage, Michael Innovation/Michael Schrage: Laboratory Experiments with Market Economics, Los Angeles Times, Nov. 23, 1989 at p. D1.*

Golden, Fran "AAL's Riga Doubts Marketel's Appeal to Retailers", Travel Weekly, Nov. 13, 1989.*

Del Rosso, Laura, Firm Proposes ticket–bidding system; Marketel explores electronic auction of travel; Marketel International., Travel Weekly, Section No. 91, vol. 48, p. 1; Nov. 13, 1989.*

Carlsen, Clifford, "Polaris Group Set to Fly the Leveraged Sky", San Francisco Business Times, Nov. 6, 1989 at p. 1.*

Kuttner, Robert, "Computers May Turn the World into One Big Commodities Pit", Business Week, Sep. 11, 1989.*

Carlsen, Clifford, "From Airline Tickets to Human Organs, the Electronic Markets Are Booming", San Francisco Business Times, Aug. 14, 1989 at p. 17.*

"Public May Submit Bids to Get Bargain Rates", Wall Street Journal, Section 2; p. 1, col. 1; Aug. 1, 1989.*

American Airlines Internet Silent Auction, selected pages downloaded from www.americanair.com.*

Apollo Host Computer, selected pages downloaded from www.appollo.com.*

"Auctioning unsold airline tickets." (http://www.newciv.org/GIB/BOV/BV–409.HTMI), at p. 1.*

Cathay Pacific:CyberTraveler Auction #3—Official Rules, selected pages downloaded from www.cathaypacific.com.*

CSM Online: About Collector's Super Mall downloaded from www.csmonline.com.*

Sabre Decision Technologies, selected pages downloaded from www.sabre.com.*

PhoneMiser: Frequently Asked Questions, downloaded from www.phonemiser.com.*

The United Computer Exchange: How It All Works, selected pages downloaded from www.uce.com.*

Tired of Shopping For the Best Home Loan?, Mortgage Loan Specialists.*

Koepper, Ken, "Room Inventory Auctioning: The Next CRS Generation", Lodging, Jan. 1990 at p. 26, 29–30.*

* cited by examiner

| | BUYER ID NUMBER 565 | NAME 570 | ADDRESS 575 | CREDIT CARD ACCOUNT NUMBER 580 | CPO NUMBER(S) 585 |
|---|---|---|---|---|---|
| 505 | 12345 | JOHN DOE | 23 MAIN ST. | 5555-6666-7777-8888 | B123 |
| 510 | 56789 | BILL SMITH | 54 COURT ST. | 8888-7777-6666-5555 | B124 |
| 515 | 98756 | JANE JOHNSON | 63 STATE ST. | 3333-4444-5555-6666 | B125 |
| 520 | 88888 | TONY JONES | 27 1ST AVE. | 4567-8910-5678-9876 | B126 |
| 525 | 77777 | SUE THOMPSON | 43 PINE ST. | 5432-1234-5678-9876 | B127 |
| 530 | 89898 | TOM JACKSON | 27 PEPPER ST. | 2222-2222-2222-2222 | B128 |
| 535 | 33333 | JAMES KLEIN | 12 MAIN ST. | 3333-4444-6666-2929 | B129 |
| 540 | 22222 | SAM GOLDSTEIN | 5 HOPE ST. | 6565-2323-1212-3757 | B130 |
| 545 | 44444 | DAVID BROWN | 9 PENNSYLVANIA AVE. | 6969-2424-4747-7373 | B131 |
| 550 | 45454 | CINDY WILSON | 29 PARK AVE. | 3131-2929-8383-4949 | B132 |
| 555 | 65656 | BOB MCARTHUR | 37 CHURCH ST. | 2233-6677-8899-1122 | B133 |

FIG. 5

| SELLER ID NUMBER 640 | SELLER NAME 645 |
|---|---|
| AL345 | AMERICAN AIRLINES |
| AL346 | AVIS |
| AL347 | UNITED |
| INS123 | TRAVELER'S |
| INS125 | AETNA |

FIG. 6

| CPO NUMBER 930 | STATUS 935 | SUBJECT 940 | PRICE 945 | AGGREGATE CPO EXPIRATION DATE 950 | CONDITIONS 955 | QUANTITY OF INDIVIDUAL CPOS IN AGGREGATE 960 | BUYER ID'S 965 | INDIVIDUAL CPO NUMBER 970 |
|---|---|---|---|---|---|---|---|---|
| A001 | COMPLETED | AIRLINE TICKETS | $353.30 | 7/10/97 | ROUND-TRIP JFK TO LAX, LEAVE 7/14, RETURN 7/21 | 3 | 12345 56789 98765 | B123 B124 B125 |
| A002 | ACTIVE | AUTO INSURANCE | $825 | 7/3/97 | 1 YEAR TERM 1897 FORD TEMPO DRIVER RISK LEVEL 17 | 3 | 33333 22222 44444 | B129 B130 B131 |

FIG. 9

| CPO NUMBER 1030 | BUYER ID NUMBER 1035 | SUBJECT 1040 | ORIGINAL CPO CONDITIONS 1045 | ORIGINAL CPO PRICE 1050 | ORIGINAL CPO EXPIRATION DATE 1055 | ALTERNATE CONDITIONS REQUESTED 1060 | ALTERNATE PRICE REQUESTED 1065 | ALTERNATE EXPIRATION DATE REQUESTED 1070 | BUYER RESPONSE 1075 |
|---|---|---|---|---|---|---|---|---|---|
| B123 | 12345 | AIRLINE TICKETS | ROUND-TRIP JFK TO LAX, LEAVE 7/14, RETURN 7/21 | $350 | 7/5 | N/A | N/A | 7/10 | ACCEPTED |
| B128 | 89898 | CAR RENTAL | LUXURY CAR 8/1 TO 8/8 | $300 | 7/30 | MID-SIZE CAR 8/1 TO 8/8 | N/A | N/A | REJECTED |
| B124 | 56789 | AIRLINE TICKETS | ROUND-TRIP JFK TO LAX, LEAVE 7/15, RETURN 7/22 | $300 | 7/10 | ROUND-TRIP JFK TO LAX, LEAVE 7/14, RETURN 7/21 | N/A | N/A | ACCEPTED |
| B129 | 22222 | AUTO INSURANCE | 6 MONTH TERM 1987 FORD TEMPO | $500 | 7/30 | 1 YEAR TERM 1987 FORD TEMPO DRIVER RISK LEVEL 17 | $1,000 | N/A | ACCEPTED |

FIG. 10

SYSTEM AND METHOD FOR AGGREGATING MULTIPLE BUYERS UTILIZING CONDITIONAL PURCHASE OFFERS (CPOS)

CROSS REFERENCE TO RELATED APPLICATIONS

This application is a continuation-in-part of U.S. patent application Ser. No. 08/889,319, filed Jul. 8, 1997, which is a continuation-in-part of U.S. patent application Ser. No. 08/707,660, filed Sep. 4, 1996, now U.S. Pat. No. 5,794,207, each incorporated by reference herein.

FIELD OF THE INVENTION

The present invention relates generally to a system for processing the sale of goods and services and, more particularly, to a system for managing the sale of goods and services by one or more sellers to a group of buyers who have submitted purchase offers for the purchase of such goods and services.

BACKGROUND OF THE INVENTION

Most systems for processing the sale of products are seller-driven, whereby the seller prices, packages, configures and offers the product for sale, and the buyer decides whether or not to accept the seller's offer. In a buyer-driven system, on the other hand, the buyer dictates the terms of the offer and one or more sellers decide whether or not to accept. A "help wanted" advertisement, for example, is a buyer-driven inquiry since the employer is looking to locate and buy the services of a qualified employee. The inquiry is advertised to a large number of potential employees, who may respond by submitting their resumes to the prospective employer.

Many large organizations, such as corporations or government entities, utilize a buyer-driven system to purchase goods or services at the lowest possible price. Initially, the purchaser formulates a detailed written specification, typically called a "Request for Proposal" (RFP), setting forth the quantities and requirements of what the purchaser is looking to buy. Once finalized, the RFPs are distributed to a list of known potential suppliers. Potential suppliers then screen the RFPs to identify those that they might be able to fulfill, and thereafter determine whether or not to invest the necessary time and effort to submit a formal, legally binding proposal to the buyer by a deadline established in the RFP. Once submitted, the proposals are evaluated by the buyer, and the chosen supplier, corresponding to the selected proposal, is notified that it has "won" the business at the price quoted.

Large organizations can take advantage of the benefits afforded by the RFP process because their volume buying represents a worthwhile opportunity for suppliers to compete for their business. In addition, large organizations have the resources to communicate their buying needs to a sufficient number of suppliers. As a result, large organizations can often achieve substantial unit cost savings, especially on commodities or commodity services (such as office supplies, insurance or long distance service) and on perishable items (such as airline tickets and hotel rooms). Individual consumers, however, cannot effectively participate in the RFP process with current systems because they generally do not have the bulk buying power and resources of large organizations.

While there have been attempts to utilize the Internet to effectuate bilateral buyer-driven transactions between individual consumers and sellers, those attempts have been largely unsuccessful. For example, buyers can post "wanted" advertising at little or no cost on "bulletin board" type Internet sites. Thus, consumers can essentially post their own RFP to a large number of potential sellers. In practice, however, it is impractical for potential sellers to frequent the various "bulletin board" sites or respond to the individual RFPs which typically have diverse formats, conditions, terms, and language styles. In addition, sellers are deterred from using such a process because there is (i) no guarantee of the authenticity of the RFP, (ii) the cost of negotiating with individual consumers is often too high, and (iii) it is difficult to enforce any agreement (including payment guarantees) which may be reached between the consumer and the seller. In turn, the absence of a critical mass of sellers reduces the incentive for buyers to post their RFPs.

Thus, current systems do not permit individuals to effectively utilize the buying power associated with volume purchases to achieve the same substantial unit cost savings which are available to institutional purchasers, especially on commodities and perishable items. While prior systems have attempted to exploit the purchasing power associated with groups of consumers, no prior system has solved the above-mentioned problems of authenticating the group's offer and enforcing any agreement reached between the group and the seller.

The aggregation of buyers provides benefits to sellers as well. For example, it is well known in the insurance industry to provide insurance to groups of individuals at a reduced price. The cost savings are attributable, at least in part, to the reduced costs incurred by the insurance carrier in negotiating a single group policy, as well as to the reduced ongoing administration costs. Again, no prior insurance system has solved the above-mentioned problems of authenticating the group's offer and enforcing any agreement reached between the group and the carrier. In addition, no prior insurance system permits an offer for a group insurance policy to be formed based on a plurality of offers received from individuals, such as self-employed individuals, attempting to obtain the cost savings associated with group insurance.

As apparent from the above deficiencies with conventional systems for selling goods and services, such as insurance and travel-related services, a need exists for a buyer-driven system that permits a buyer to obtain goods and services at a price set by the buyer, at a price typically below the retail price. Yet another need exists for a system that permits sellers to stimulate sales of excess inventory, without compromising the seller's published price structure. Another need exists for a system to administer CPOs on behalf of groups of buyers, and thereby provide individuals with group discounts and other benefits associated with volume purchasing.

SUMMARY OF THE INVENTION

Generally, according to one aspect of the invention, an aggregate conditional purchase offer (CPO) management system is disclosed for receiving and processing individual CPOs from buyers for one or more goods or services. The aggregate CPO management system processes each received CPO to determine whether the CPO should be provided to sellers individually and/or collectively as part of an aggregate CPO, comprised of a plurality of individual CPOs. If a seller accepts a given CPO, either individually or collectively as part of an aggregate CPO, the aggregate CPO management system binds the buyer(s) on behalf of the accepting seller, to form one or more legally binding contracts. A CPO is a binding offer containing one or more conditions submitted by a buyer for the purchase of goods or services or both, such as travel or insurance services, at a buyer-defined price. The CPO may be guaranteed, for example, by a general-purpose account, such as a credit or debit account.

The aggregate CPO management system administers individual CPOs on behalf of groups of individual buyers to form aggregate CPOs, which are offered to sellers. In this manner, individuals are able to obtain group discounts and other benefits associated with volume purchases. The aggregate CPO management system preferably forms groups dynamically in accordance with predefined aggregation rules. Individual buyers may not know that their individual CPO has been aggregated as part of a group into an aggregate CPO. In one embodiment, the aggregate CPO price is an average of the individual CPO prices for each CPO included in the aggregate CPO. The aggregation rules can optionally require that the terms of an individual CPO, including price, be within predefined tolerances of the terms of an aggregate CPO or one or more pending individual CPOs, in order for the individual CPO to be included in an aggregate CPO.

The aggregate CPO management system preferably permits a buyer to review pending aggregate CPOs, prior to submitting a new CPO, so that the buyer can request to include a CPO in one or more existing aggregate CPOs. Thus, buyers can ensure that the conditions of their CPO for the purchase of goods or services can meet the conditions of the requested aggregate CPOs. In addition, the aggregate CPO management system can request a buyer to modify the original terms of a CPO to conform the terms to an existing aggregate CPO or one or more pending individual CPOs, so that the modified CPO can be included with the pending aggregate CPO or the pending individual CPOs to form a new aggregate CPO.

A buyer's CPO can optionally be provided simultaneously to sellers individually and collectively, as part of one or more aggregate CPOs. If the buyer's CPO is first accepted as part of an aggregate CPO, the status of the accepted aggregate CPO and the individual CPO is changed to "completed," and the terms of the other non-accepted aggregate CPOs, if any, are adjusted to reflect the removal of the individual CPO. If the buyer's individual CPO is accepted first, the status of individual CPO is changed to "completed" and the terms of each aggregate CPO is adjusted to reflect the removal of the individual CPO that was simultaneously included in the aggregate CPO.

A more complete understanding of the present invention, as well as further features and advantages of the present invention, will be obtained by reference to the following detailed description and drawings.

BRIEF DESCRIPTION OF THE DRAWINGS

FIG. 5 illustrates a sample table from the buyer database of FIG. 2;

FIG. 6 illustrates a sample table from the seller database of FIG. 2;

FIG. 9 illustrates a sample table from the aggregate CPO database of FIG. 2;

FIG. 10 illustrates a sample table from the alternate condition request database of FIG. 2;

DETAILED DESCRIPTION

Figure 1:
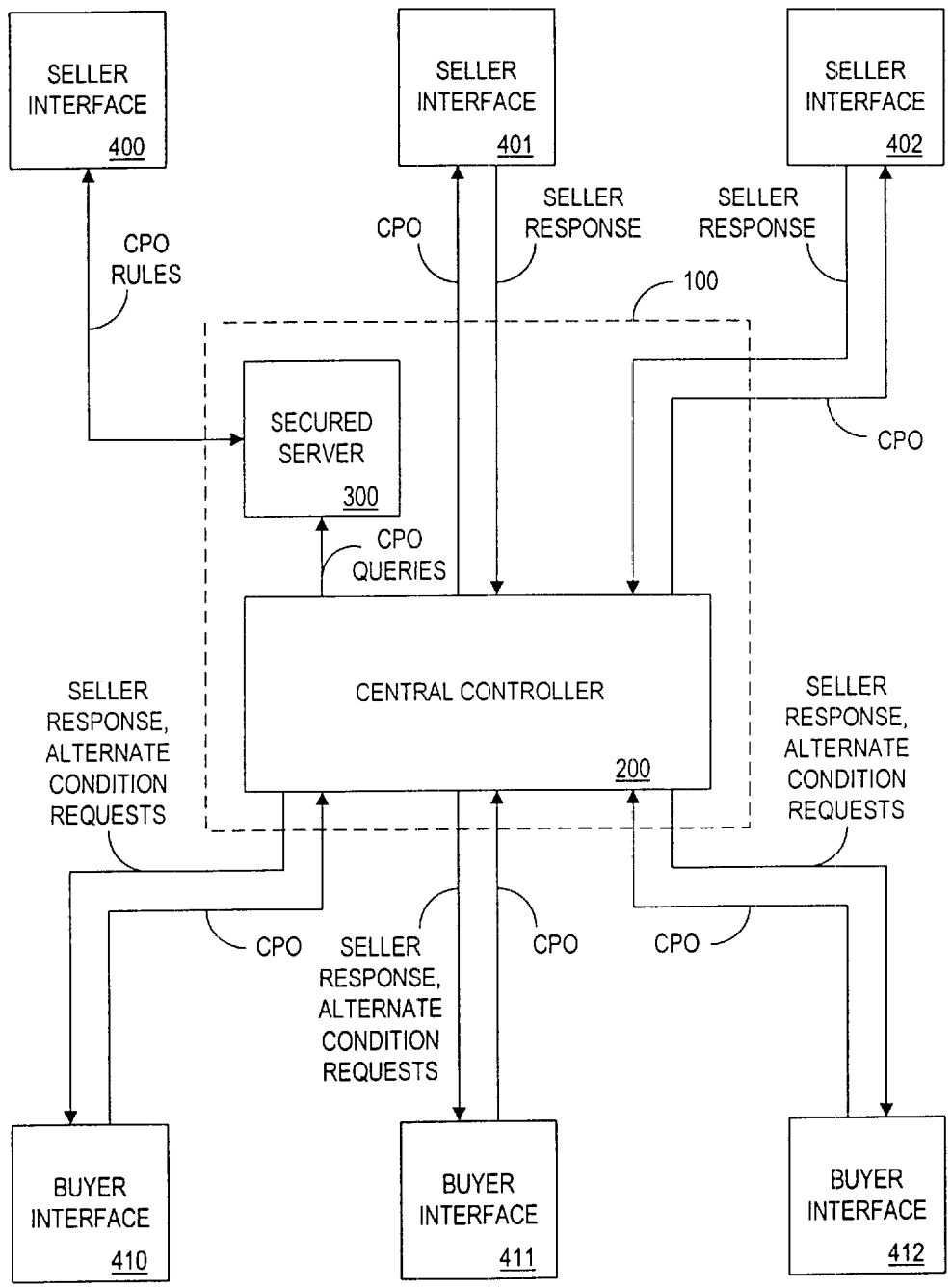
FIG. 1 is a schematic block diagram illustrating an aggregate conditional purchase offer (CPO) management system in accordance with one embodiment of the present invention.

FIG. 1 shows an aggregate conditional purchase offer (CPO) management system 100 for receiving and processing CPOs from one or more buyers, utilizing buyer interfaces 410–412, for one or more goods or services. The aggregate CPO management system 100 processes each received CPO to determine whether the CPO should be provided to sellers, utilizing seller interfaces 400–402, individually and/or collectively as part of an aggregate CPO, comprised of a plurality of individual CPOs. As discussed further below, if a seller accepts a given CPO, either individually or collectively as part of an aggregate CPO, the aggregate CPO management system 100 binds the buyer 410 on behalf of the accepting seller 400, to form a legally binding contract.

As used herein, a CPO is a binding offer containing one or more conditions submitted by a buyer for the purchase of goods or services or both, such as travel or insurance services, at a buyer-defined price. The CPO may be guaranteed, for example, by a general-purpose account, such as a credit or debit account. In the illustrative airline embodiment, the customer-defined conditions would include itinerary parameters, such as the origin and destination cities; acceptable dates and times of departure and return; and whether connecting flights or stopovers are acceptable to the customer. In addition, the parameters of a CPO may allow a customer to specify one or more preferred airline(s), flights, seat assignments, seat class, aircraft type, refund/change rules, or maximum layover time.

According to one feature of the present invention, the aggregate CPO management system 100 administers CPOs on behalf of groups of buyers to form aggregate CPOs which are offered to sellers. In this manner, individuals are able to obtain group discounts and other benefits associated with volume purchases. As discussed below, the aggregate CPO management system 100 preferably forms groups dynamically in accordance with aggregation rules, as individual CPOs are received. It is noted that individual buyers may not know that their individual CPO has been aggregated as part of a group into an aggregate CPO.

In one preferred embodiment, the aggregate CPO contains a unit price that is an average of the individual CPO prices for each CPO included in the aggregate CPO. In another embodiment, the aggregate CPO price is the total of the individual CPO prices for each CPO included in the aggregate CPO. In this manner, as individual CPOs are added to existing aggregate CPOs, the aggregate CPO price is preferably adjusted. In both embodiments, it is anticipated that the buyer will pay the original offer price specified in the buyer's CPO. Alternatively, the buyer can pay the average price of the individual CPOs within the aggregate CPO, or another modified price. The individual CPO prices offered by individual buyers may vary so that a higher individual CPO price can offset below-average CPO prices. In one embodiment, the aggregation rules can require that the terms of an individual CPO, including price, be within predefined tolerances of the terms of an aggregate CPO, in order for the individual CPO to be included in the aggregate CPO. In addition, periodic maintenance is preferably performed to analyze the individual CPOs within each aggregate CPO to remove statistical outliers from the group.

The aggregate CPO management system 100 preferably permits a buyer to review pending aggregate CPOs, prior to submitting a new CPO, so that the buyer can request to include a CPO in one or more existing aggregate CPOs. In this manner, the buyer can ensure that the conditions of the CPO specified by the buyer for the purchase of goods or services can meet the conditions of the requested existing aggregate CPOs. In a further variation, the aggregate CPO management system 100 can request a buyer to modify the original terms of a CPO to conform the terms to an existing aggregate CPO or one or more pending individual CPOs, so that the modified CPO can be included with the pending aggregate CPO or the pending individual CPO(s) to form a new aggregate CPO. In yet another variation, the individuals within a group associated with a given aggregate CPO may be required to approve the addition of any further individuals in the group.

In an illustrative insurance implementation, the aggregate CPO management system 100 permits the formation of groups of buyers such that a common risk portfolio can be presented in an aggregate CPO to insurance companies. As buyers individually submit CPOs for insurance, the aggregate CPO management system 100 preferably collects risk evaluation data, such as demographics, driving records or tobacco consumption behavior. The aggregate CPO management system 100 then preferably "scores" the received risk evaluation data, using conventional risk scoring methods, as would be apparent to a person of ordinary skill. As individual CPOs are received for similar insurance products, the aggregate CPO management system 100 preferably averages the risk scores of each individual buyer, to form a group.

In one preferred embodiment, the aggregate CPO management system 100 permits groups having a desired demographic or risk assessment composition to be formed. For example, if an insurance company has an efficient treatment protocol for certain high risk patients, such as cardiac patients, the insurance company may desire to insure such individuals in a group, in exchange or the corresponding appropriate premiums. Thus, if the annual cost to the insurance company for treating such high-risk patients is below the annual premium, the difference may be retained as profit. According to a further feature of the invention, the aggregate CPO management system 100 preferably withholds personal information from each insurance carrier until an aggregate CPO is accepted and the group policy is issued, thereby preventing discrimination.

In a preferred embodiment, a buyer's CPO can simultaneously be provided to sellers individually and collectively, as part of one or more aggregate CPOs. If the buyer's CPO is first accepted as part of an aggregate CPO, the status of the accepted aggregate CPO and the individual CPO is changed to "completed," and the terms of the other non-accepted aggregate CPOs, if any, are adjusted to reflect the removal of the individual CPO. If the buyer's individual CPO is accepted first, the status of individual CPO is changed to "completed" and the terms of each aggregate CPO is adjusted to reflect the removal of the individual CPO.

Although the aggregate CPO management system 100 is illustrated herein primarily as a system for selling insurance or travel-related services, the aggregate CPO management system 100 could be utilized to sell any good or service, such as automobiles or computer equipment, as would be apparent to a person of ordinary skill. For a more detailed discussion of a general CPO management system for selling such items, see U.S. patent application Ser. No. 08/707,660, filed Sep. 4, 1996, the parent application to the present invention, which is incorporated by reference herein.

AGGREGATE CPO MANAGEMENT SYSTEM

As shown in FIG. 1, the aggregate CPO management system 100 preferably includes a central controller 200 and one or more secured servers 300, for communicating with one or more seller or buyer interfaces 400–402 and 410–412, respectively. The aggregate CPO management system 100 may provide a given CPO to selected sellers based on the industry associated with the CPO or other predefined screening criteria, so that sellers only obtain CPOs that they may be interested in or are authorized to screen. Alternatively, the aggregate CPO management system may provide all CPOs to all sellers for screening.

According to one feature of the present invention, the aggregate CPO management system 100 preferably provides an optional agency feature that permits the aggregate CPO management system 100 to accept or reject a given CPO on behalf of certain agency-based sellers who have delegated such authority to the aggregate CPO management system 100. Thus, the aggregate CPO management system 100 preferably (i) evaluates CPOs on behalf of certain agency-based sellers who have delegated authority to the aggregate CPO management system 100 to accept or reject a given CPO, and (ii) permits broadcast-based sellers to evaluate CPOs independently. Thus, the aggregate CPO management system 100 can preferably provide a CPO to each broadcast-based seller, for the seller to independently determine whether or not to accept a given CPO. It is noted that the aggregate CPO management system 100 can provide a CPO to each appropriate broadcast-based seller, for example, by means of a broadcast transmission, or by means of posting the CPO, for example, on an electronic bulletin board accessible by each broadcast-based seller. Alternatively, the aggregate CPO management system 100 can evaluate a CPO against a number of CPO rules defined by one or more agency-based sellers, to decide on behalf of an agency-based seller to accept or reject a given CPO. Thus, the aggregate CPO management system 100 can determine if one or more sellers accepts a given CPO by providing the CPO to each seller and receiving an acceptance or rejection, or by applying the CPO to the CPO rules to render a decision to either accept, reject or counter a CPO on behalf of a particular seller.

As discussed further below, a CPO rule is a set of restrictions defined by a given agency-based seller, such as seller 400, to define a combination of such restrictions for which the seller is willing to accept a predefined minimum price. In addition, CPO rules can include guidelines defined by a given agency-based seller, such as seller 400, for the formation of groups as part of an aggregate CPO. In this manner, aggregate CPOs can be formed by the aggregate CPO management system 100 in accordance with the predefined preferences of the corresponding agency-based seller 400. In one embodiment, the CPO rules are generated by the revenue management system, yield management system, or profit management system of the respective agency-based seller, or by any system that controls and manages inventory. For a more detailed discussion of CPO rules, the manner in which they are generated and related security issues, see U.S. patent application Ser. No. 08/889, 319, entitled Conditional Purchase Offer Management System, filed Jul. 8, 1997, the parent application to the present invention, which is incorporated by reference herein. Generally, the revenue management system, for example, will employ a CPO rules generation process to generate CPO rules by evaluating current inventory, pricing and revenue information, as well as historical patterns and external events, to forecast future demand.

For example, in an airline embodiment, a CPO rule for a given agency-based airline can specify that the airline will accept any aggregate CPO for travel between Newark, N.J. (EWR) and Orlando, Fla. (MCO) during the month of October, 1997, provided that (i) the customer travels between Tuesday and Thursday, (ii) the tickets are booked within 21 days of departure, (iii) the price is at least $165 per ticket, (iv) K-class inventory is available on all flight segments of the customer's itinerary, and (v) there are at least two (2) passengers travelling together. Similarly, in an insurance application, a CPO rule for a given agency-based insurance company or health maintenance organization (HMO) can specify that the insurance company will accept ally aggregate CPO for health insurance providing acceptable risk scores, such as an aggregate CPO including up to five (5) individuals who smoke in a group of at least 100 other individuals who are non-smokers.

As discussed further below in conjunction with FIG. 3, each secured server 300 may be associated with one or more agency-based sellers and each server 300 stores, among other things, the CPO rules defined by any associated agency-based sellers, such as seller 400. Each secured server 300 may be remotely located from the central controller 200, or may be integrated with the central controller 200. In one remote embodiment, the secured server 300 associated with each agency-based seller may be physically located at a processing facility secured by the particular seller, or at the physical location of a third party.

As discussed further below, each buyer contacts the aggregate CPO management system 100, for example, by means of telephone, facsimile, online access, e-mail, in-person contact or through an agent, and provides the aggregate CPO management system 100 with the terms of their CPO. It is noted that each buyer may employ a general-purpose computer, such as the buyer interface 410, discussed below in conjunction with FIG. 4, for communicating with the aggregate CPO management system 100. The general-purpose computer of each buyer is preferably comprised of a processing unit, a modem, memory means and any software required to communicate with the aggregate CPO management system 100.

Once the terms of the CPO have been received by the aggregate CPO management system 100, the central controller 200 will execute a CPO aggregation process 1300, discussed below in conjunction with FIGS. 13*a* through 13*c*, to receive a CPO from a buyer and to determine whether the CPO should be (i) included with a pending aggregate CPO, (ii) included with one or more pending CPOs to form a new aggregate CPO, or (iii) processed independently. In addition, the aggregate CPO management system 100 will periodically execute an aggregate CPO monitoring process 1400, discussed further below in conjunction with FIGS. 14*a* though 14*b*, to (i) provide each CPO to the appropriate broadcast-based sellers and (ii) evaluate each CPO against the appropriate CPO rules of each appropriate agency-based seller. In addition, once the CPOs have been posted, the aggregate CPO monitoring process 1400 will preferably monitor each CPO to determine if it is accepted by an appropriate seller. If a given CPO is accepted by one or more sellers, the aggregate CPO management system 100 notifies the buyer, on behalf of each of the accepting seller(s), that the buyer has been bound to purchase the goods or services specified in the CPO which meet the conditions defined by the buyer.

The aggregate CPO management system 100 and seller and buyer interfaces 400–402 and 410–412 (collectively, the "nodes") preferably transmit digitally encoded data and other information between one another. The communication links between the nodes preferably comprise a cable, fiber or wireless link on which electronic signals can propagate. For example, each node may be connected via an Internet connection using a public switched telephone network (PSTN), such as those provided by a local or regional telephone operating company. Alternatively, each node may be connected by dedicated data lines, cellular, Personal Communication Systems ("PCS"), microwave, or satellite networks.

Figure 2:
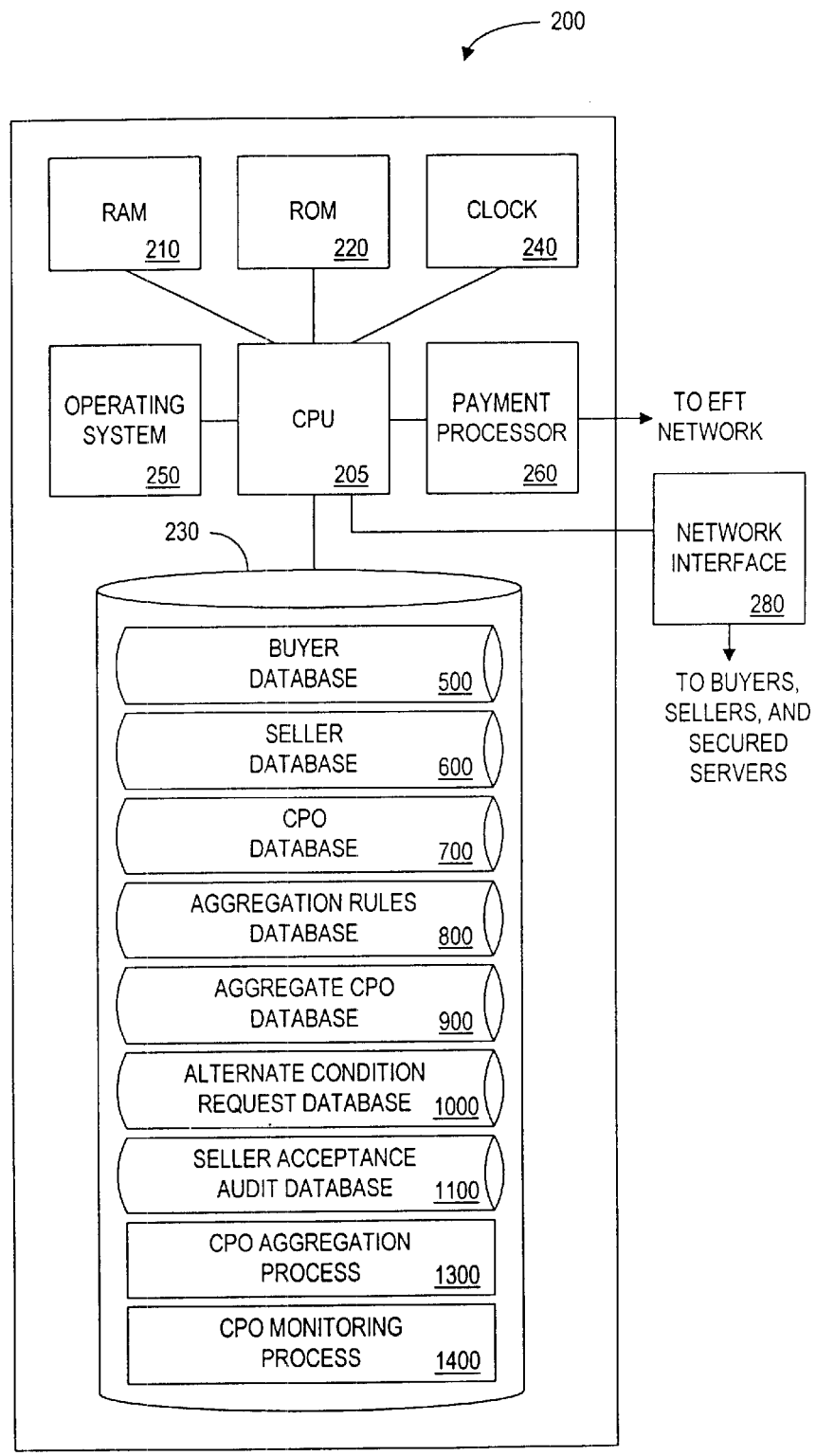
FIG. 2 is a schematic block diagram of the exemplary central controller of FIG. 1.

FIG. 2 is a block diagram showing the architecture of an illustrative central controller 200, The central controller 200 preferably includes certain standard hardware components, such as a central processing unit (CPU) 205, a random access memory (RAM) 210, a read only memory (ROM) 220, a data storage device 230, a clock 240, an operating system 250, a payment processor 260 and a network interface 280. The CPU 205 is preferably linked to each of the other listed elements, either by means of a shared data bus, or dedicated connections, as shown in FIG. 2.

The CPU 205 may be embodied as a single commercially available processor, such as Intel's Pentium 100 MHz P54C microprocessor, Motorola's 120 MHz PowerPC 604 microprocessor or Sun Microsystem's 166 MHz UltraSPARC-1 microprocessor. Alternatively, the CPU 205 may be embodied as a number of such processors operating in parallel.

The ROM 220 and/or data storage device 230 are operable to store one or more instructions, discussed further below in conjunction with FIGS. 13 and 14, which the CPU 205 is operable to retrieve, interpret and execute. The payment processor 260 preferably implements known processes to accomplish the authorization and transfer of required payments, charges and debits, between the sellers and buyers, by means of a conventional electronic funds transfer (EFT) network for transferring electronic cash, as well as debit and credit card transactions. In particular, as discussed below in conjunction with FIG. 14, the aggregate CPO monitoring process 1400 preferably transmits the credit card information associated with a given buyer to an accepting seller for payment, if the goods or services specified by a CPO are actually purchased by the buyer. The processing of such accounting transactions are preferably secured in a conventional manner, for example, using well-known cryptographic techniques.

The CPU 205 preferably includes a control unit, an arithmetic logic unit (ALU), and a CPU local memory storage device, such as, for example, a stackable cache or a plurality of registers, in a known manner. The control unit is operable to retrieve instructions from the data storage device 230 or ROM 220. The ALU is operable to perform a plurality of operations needed to carry out instructions. The CPU local memory storage device is operable to provide high-speed storage used for storing temporary results and control information.

As discussed further below in conjunction with FIGS. 5 through 11, respectively, the data storage device 230 includes a buyer database 500, a seller database 600, a CPO database 700, an aggregation rules database 800, an aggregate CPO database 900, an alternate condition request database 1000 and a seller acceptance audit database 1100. The buyer database 500 preferably stores information on each buyer of the aggregate CPO management system 100, including biographical information and billing information, such as a credit card number. The seller database 600 preferably stores information on each seller which is registered with the aggregate CPO management system 100 to sell goods or services to CPO buyers. The CPO database 700 preferably contains a record of each CPO being processed by the aggregate CPO management system 100, including the conditions of each CPO and the associated status. The aggregation rules database 800 preferably maintains a set of rules which may be utilized by the aggregate CPO management system 100 to determine if a received CPO can be included with a pending aggregate CPO or one or more pending individual CPOs to form a new aggregate CPO. The aggregate CPO database 900 contains a record of each aggregate CPO being processed by the aggregate CPO management system 100, including the conditions and status of the aggregate CPO, as well as the individual CPOs included within each aggregate CPO. The alternate condition request database 1000 preferably records the original and modified conditions associated with a CPO, if the aggregate CPO management system 100 requests a buyer to modify the terms of a CPO so that it may be included in an aggregate CPO. Finally, the seller acceptance audit database 1100 preferably stores a list of accepted or bound CPOs, which may be utilized for auditing purposes.

In addition, the data storage device 230 includes a CPO aggregation process 1300 and aggregate CPO monitoring process 1400, discussed further below in conjunction with FIGS. 13 and 14, respectively. Generally, the CPO aggregation process 1300 receives a CPO from a buyer and determines whether the CPO should be (i) included with a pending aggregate CPO, (ii) included with one or more pending CPOs to form a new aggregate CPO, or (iii) processed independently. The aggregate CPO monitoring process 1400 (i) provides each CPO to the appropriate broadcast-based sellers and (ii) evaluates each CPO against the appropriate CPO rules of each appropriate agency-based seller. In addition, once the CPOs have been posted, the aggregate CPO monitoring process 1400 monitors each CPO to determine if it is accepted by an appropriate seller.

The network interface 280 connects the central controller 200 to the buyer and sellers, for example, by means of an Internet connection using the public switched telephone network (PSTN). The network interface 280 preferably includes multiple communication channels for simultaneously establishing a plurality of connections.

Figure 3:
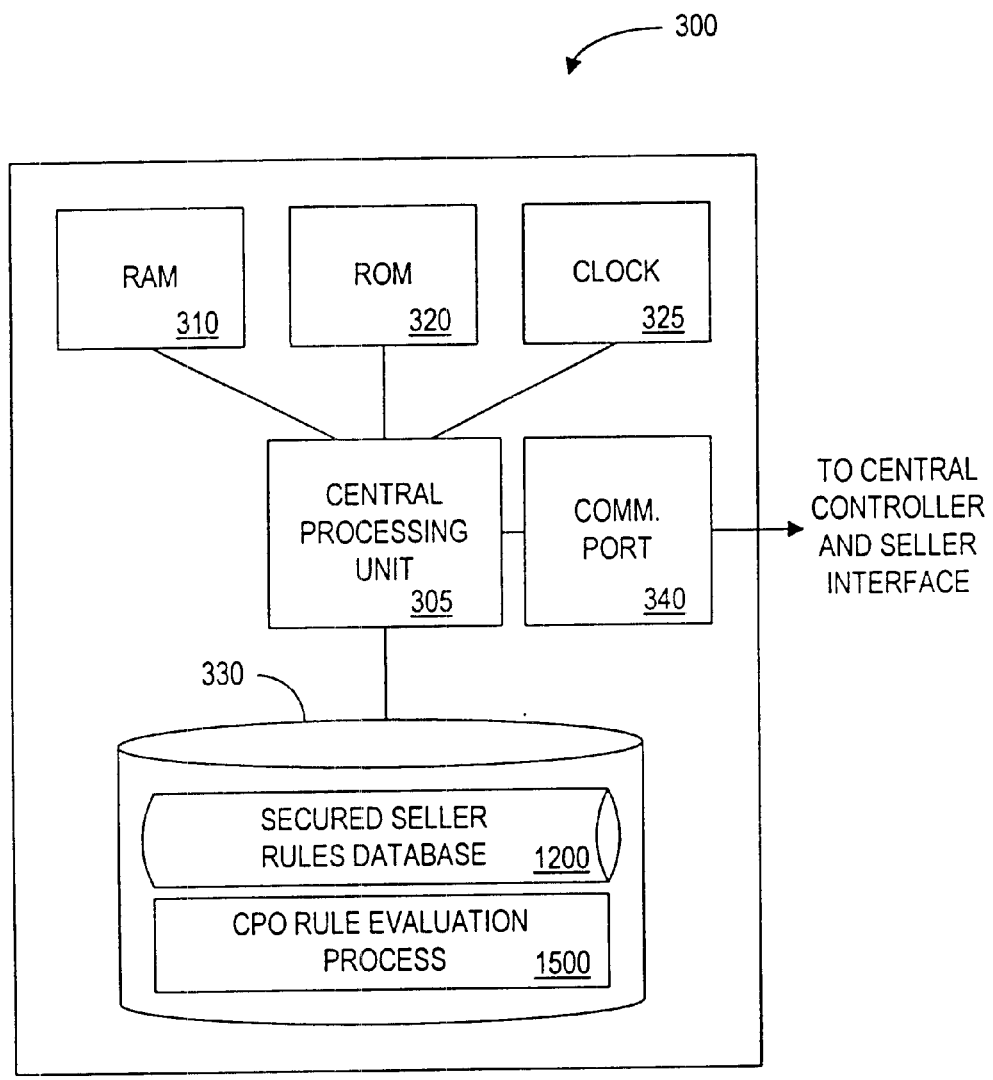
FIG. 3 is a schematic block diagram of the exemplary secured server of FIG. 1.

FIG. 3 is a block diagram showing the architecture of an illustrative secured server 300. As previously indicated, the aggregate CPO management system 100 may utilize one or more secured servers 300, each supporting one or more agency-based sellers, such as the seller 400. Each secured server 300 preferably includes certain standard hardware components, such as a central processing unit (CPU) 305, a random access memory (RAM) 310, a read only memory (ROM) 320, a clock 325, a data storage device 330, and a communications port 340. Each of these components may be identical to those described above in conjunction with FIG. 2. As previously indicated, in one embodiment, the CPO rules may be stored in a secure database to maintain the integrity and confidentiality of the highly sensitive information, such as the pricing and itinerary information included in each CPO rule. Thus, the secured server 300 preferably uses a secure database, such as the products commercially available from Oracle, Informix or IBM.

Figure 12:
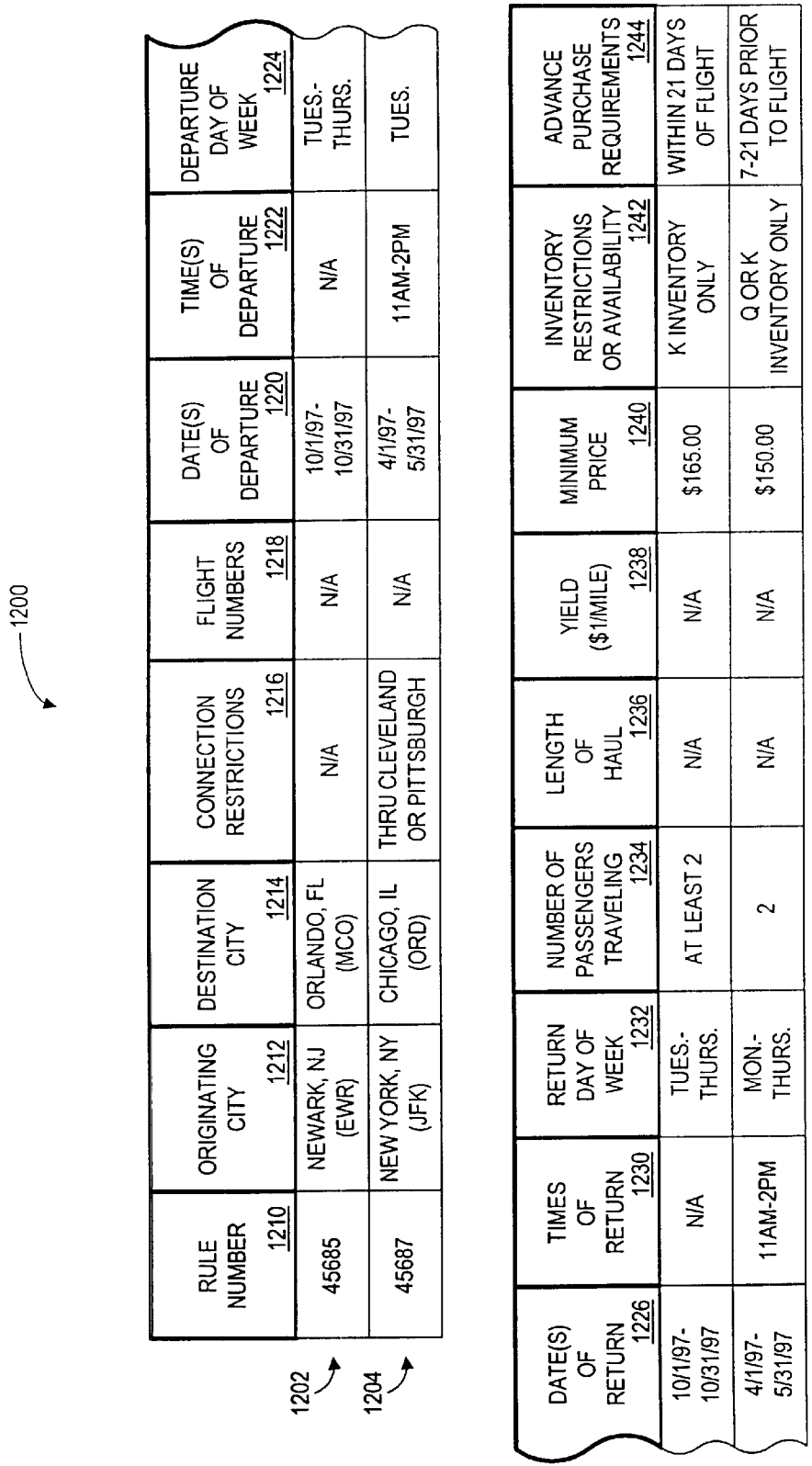
FIG. 12 illustrates a sample table from the secured seller rules database of FIG. 3.

As discussed further below in conjunction with FIG. 12, the data storage device 330 includes a secured seller rules database 1200. The secured seller rules database 1200 preferably maintains the CPO rules for the one or more agency-based sellers associated with the secured server 300. As previously indicated, the secured seller rules database 1200 may be stored in an encrypted format to maintain the integrity and confidentiality of the highly sensitive information included in the CPO rules. In addition, the data storage device 330 includes a CPO rule evaluation process 1500, discussed further below in conjunction with FIG. 15. Generally, the CPO rule evaluation process 1500 is a subroutine executed by the aggregate CPO monitoring process 1400, which receives a CPO and compares the CPO against the rules of one or more agency-based sellers to generate a response on behalf of the sellers to the given CPO.

The secured server 300 may optionally maintain an audit trail for each CPO that is processed by the aggregate CPO management system 100. For a discussion of a suitable audit system, see the parent application to the present invention, incorporated by reference herein above.

The communications port 340 connects the secured server 300 to the central controller 200. The communications port 340 preferably includes multiple communication channels for simultaneously establishing a plurality of connections.

Figure 4:
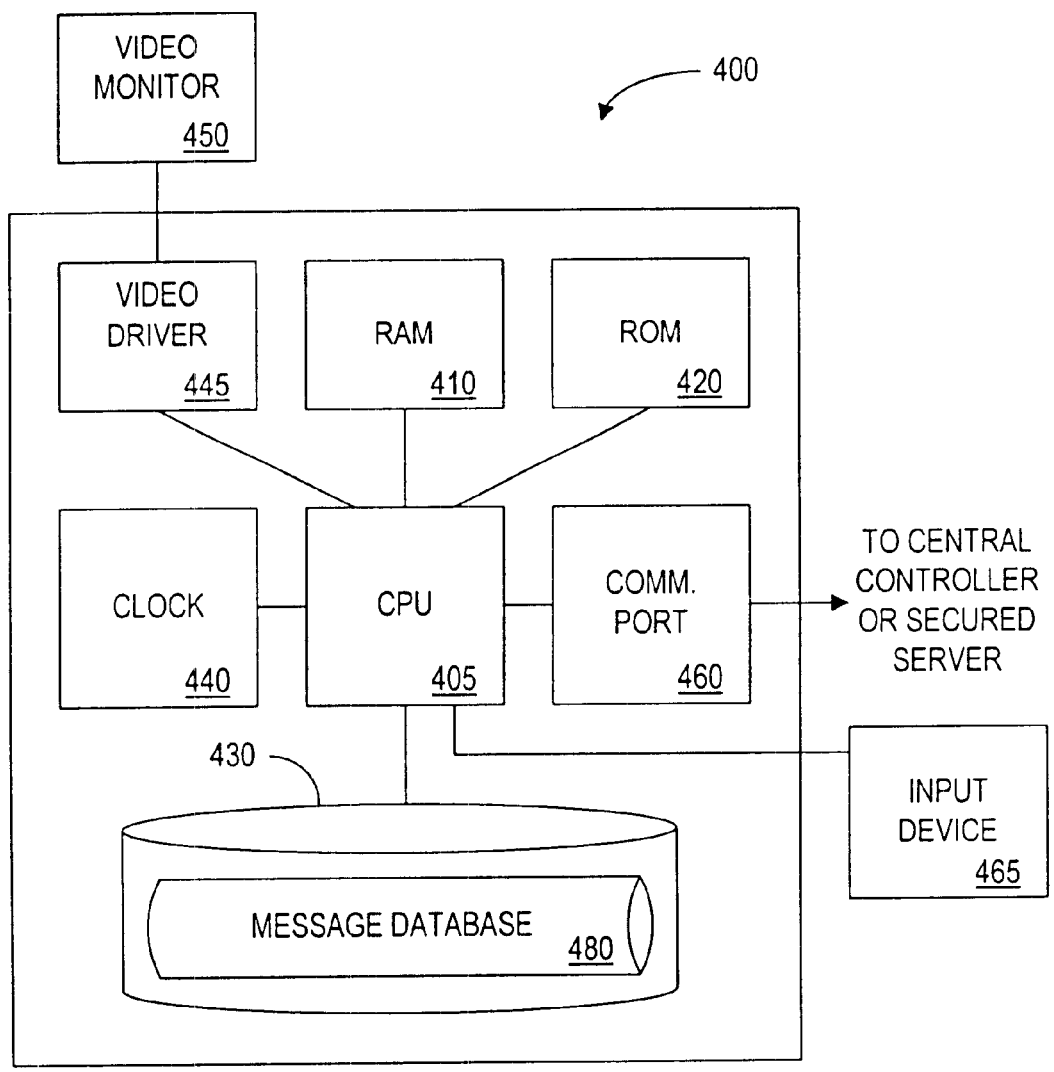
FIG. 4 is a schematic block diagram of an exemplary buyer or seller interface of FIG. 1.

FIG. 4 is a block diagram showing the architecture of an illustrative seller or buyer interface 400–402 and 410–412, such as the seller interface 400. The interface 400 preferably includes certain standard hardware components, such as a central processing unit (CPU) 405, a random access memory (RAM) 410, a read only memory (ROM) 420, a data storage device 430, a clock 440, and a communications port 460. Each of these components may be identical to those described above in conjunction with FIG. 2. In addition, the interface 400 preferably includes a video monitor 450 and related video driver 445, and an input device 465, such as a keyboard or mouse.

The data storage device 430 preferably includes a message database 480 for storing messages required by the respective seller or buyer interface 400–402 and 410–412 to communicate with the central controller 200 of the aggregate CPO management system 100. The communications port 460 connects the interface 400 to the central controller 200 or the secured server 300, for broadcast-based and agency-based sellers, respectively.

FIG. 5 illustrates an exemplary buyer database 500 that preferably stores information on each buyer of the aggregate CPO management system 100, including biographical information and billing information, such as a credit card number. The buyer database 500 maintains a plurality of records, such as records 505–555, each associated with a different buyer. For each buyer identifier in field 565, the buyer database 500 includes the corresponding buyer name and address in fields 570 and 575, respectively, and credit card number in field 580. In addition, the buyer database 500 preferably includes an indication of the CPOs associated with the buyer in field 585, which may be aggregate CPOs as described herein or individual CPOs as described in the parent application to the present invention. The buyer identifier stored in field 565 may be utilized, for example, to index a historical database (not shown) of previous purchases and CPOs associated with the buyer.

FIG. 6 illustrates an exemplary seller database 600 which preferably stores information on each seller which is registered with the aggregate CPO management system 100 to sell goods or services to CPO buyers. The seller database 600 maintains a plurality of records, such as records 605–625, each associated with a different seller. For each seller identifier listed in field 640, the seller database 600 includes the corresponding seller name in field 645. It is noted that the seller identifier stored in field 640 may be utilized to index the seller acceptance audit database 1100 to obtain a list of each CPO which has been accepted by a given seller.

Figure 7:
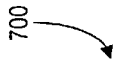
FIG. 7 illustrates a sample table from the CPO database of FIG. 2.

FIG. 7 illustrates a CPO database 700 which preferably contains a record of each CPO being processed by the aggregate CPO management system 100, including the conditions of each CPO and the associated status. The CPO database 700 maintains a plurality of records, such as records 705–755, each associated with a different CPO. For each CPO listed in field 760, the CPO database 700 includes the status, subject and price of the CPO in fields 765 through 775, respectively. In addition, the CPO database 700 preferably records the expiration date of the CPO, as well as the conditions specified by the buyer, in fields 780 and 785. Finally, an identifier of the buyer associated with each CPO is preferably recorded in field 790.

Figure 8:
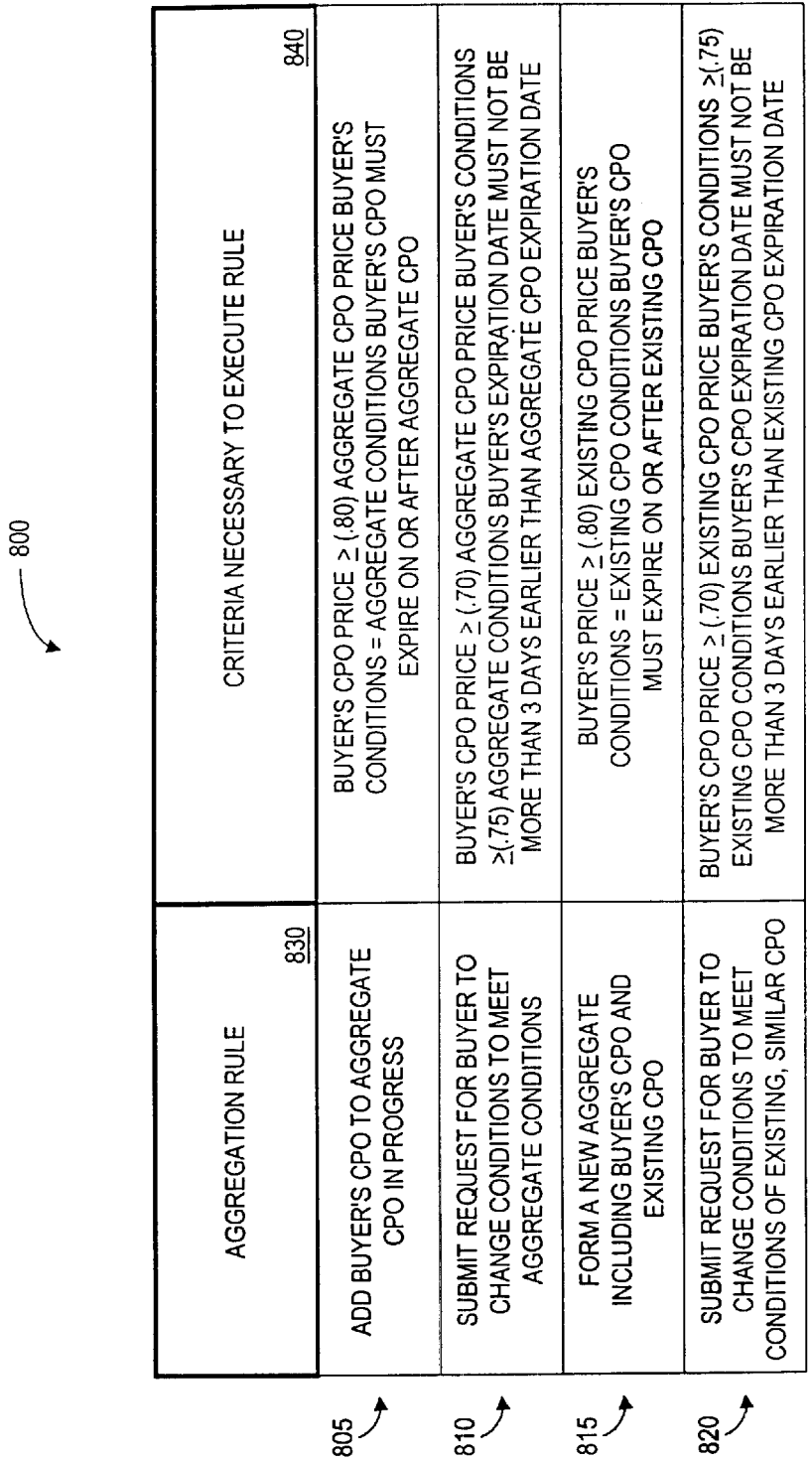
FIG. 8 illustrates a sample table from the aggregation rules database of FIG. 2.

FIG. 8 illustrates an exemplary aggregation rules database 800 which preferably maintains a set of rules which may be utilized by the aggregate CPO management system 100 to determine if a received CPO can be included with a pending aggregate CPO or one or more pending individual CPOs to form a new aggregate CPO. The aggregation rules database 800 maintains a plurality of records, such as records 805 through 820, each associated with a different aggregation rule. For each aggregation rule identified in field 830, the aggregation rules database 800 includes the criteria necessary to execute the rule in field 840. In addition to including a received CPO with a pending aggregate CPO or one or more pending individual CPOs to form a new aggregate CPO, the rules stored in the aggregation rules database 800 preferably permit the aggregate CPO management system 100 to request a buyer to modify the original terms of a CPO, so that the modified CPO can be included with a pending aggregate CPO or one or more pending individual CPOs to form a new aggregate CPO.

FIG. 9 illustrates an exemplary aggregate CPO database 900 that preferably contains a record of each aggregate CPO being processed by the aggregate CPO management system 100, including the conditions and status of the aggregate CPO, as well as the individual CPOs included within each aggregate CPO. The aggregate CPO database 900 maintains a plurality of records, such as records 905 and 910, each associated with a different aggregate CPO being processed by the system 100. For each aggregate CPO listed in field 930, the aggregate CPO database 900 includes the status, subject and price in fields 935 through 945, respectively. In addition, the aggregate CPO database 900 preferably records the expiration date, conditions and number of individual CPOs contained in the aggregate CPO in fields 950 through 960. An identifier of the individual buyers associated with each aggregate CPO is preferably recorded in field 965. Finally, each individual CPO included in the aggregate CPO is identified in field 970.

FIG. 10 illustrates an exemplary alternate condition request database 1000 that preferably records the original and modified conditions associated with a CPO, if the aggregate CPO management system 100 requests a buyer to modify the terms of a CPO so that it may be included in an aggregate CPO. The alternate condition request database 1000 maintains a plurality of records, such as records 1005 through 1020, each associated with a different CPO for which the system 100 has requested a modification. For each CPO listed in field 1030, the alternate condition request database 1000 includes an identifier of the buyer in field 1035, and the subject, conditions, price and expiration date of the original CPO in fields 1040 through 1055, respectively. In addition, the alternate condition request database 1000 includes the modified conditions, price and expiration date as requested by the system 100 in fields 1060 through 1070, respectively. Finally, the aggregate CPO management system 100 records the status of the modification request in field 1075.

FIG. 10 illustrates an exemplary seller acceptance audit database 1100 that preferably stores a list of accepted or bound CPOs, which may be utilized for auditing purposes. The seller acceptance audit database 1100 maintains a plurality of records, such as records 1105 through 1120, each associated with a different CPO acceptance received by the system 100. For each seller identified in fields 1130 and 1135, the seller acceptance audit database 1100 includes audit information for each of the CPOs which have been accepted by the seller. Thus, the accepted CPOs are identified by CPO number in field 1140, together with the date and time of the acceptance in fields 1150 and 1160.

As previously indicated, the secured server 300 preferably maintains one or more secured seller rules databases 1200 to store the CPO rules for the one or more agency-based sellers associated with the secured server 300. An example of a secured seller rules database 1200 is shown in FIG. 12 for an agency-based airline. As previously indicated, the secured seller rules database 1200 may be stored in an encrypted format to maintain the integrity and confidentiality to the highly sensitive information included in the CPO rules. The secured seller rules database 1200 maintains a plurality of records, such as records 1202 and 1204, each associated with a different CPO rule. For each CPO rule identified by rule number in field 1210, the secured seller rules database 1200 includes the associated restrictions defined by the respective agency-based airline in fields 1212 through 1244.

Figure 13A:
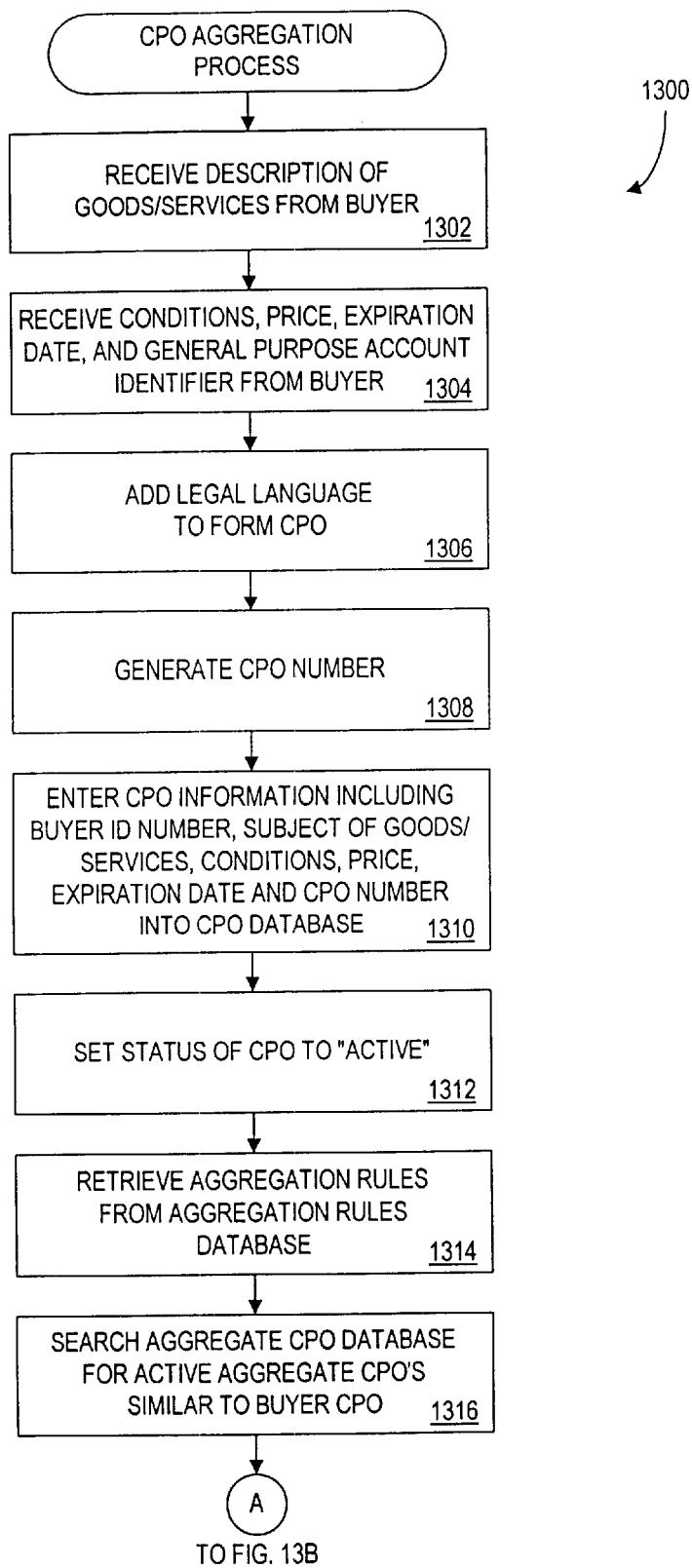
FIGS. 13a through 13c, collectively, are a flowchart describing an exemplary CPO aggregation process implemented by the central controller of FIG. 2.
Figure 13B:
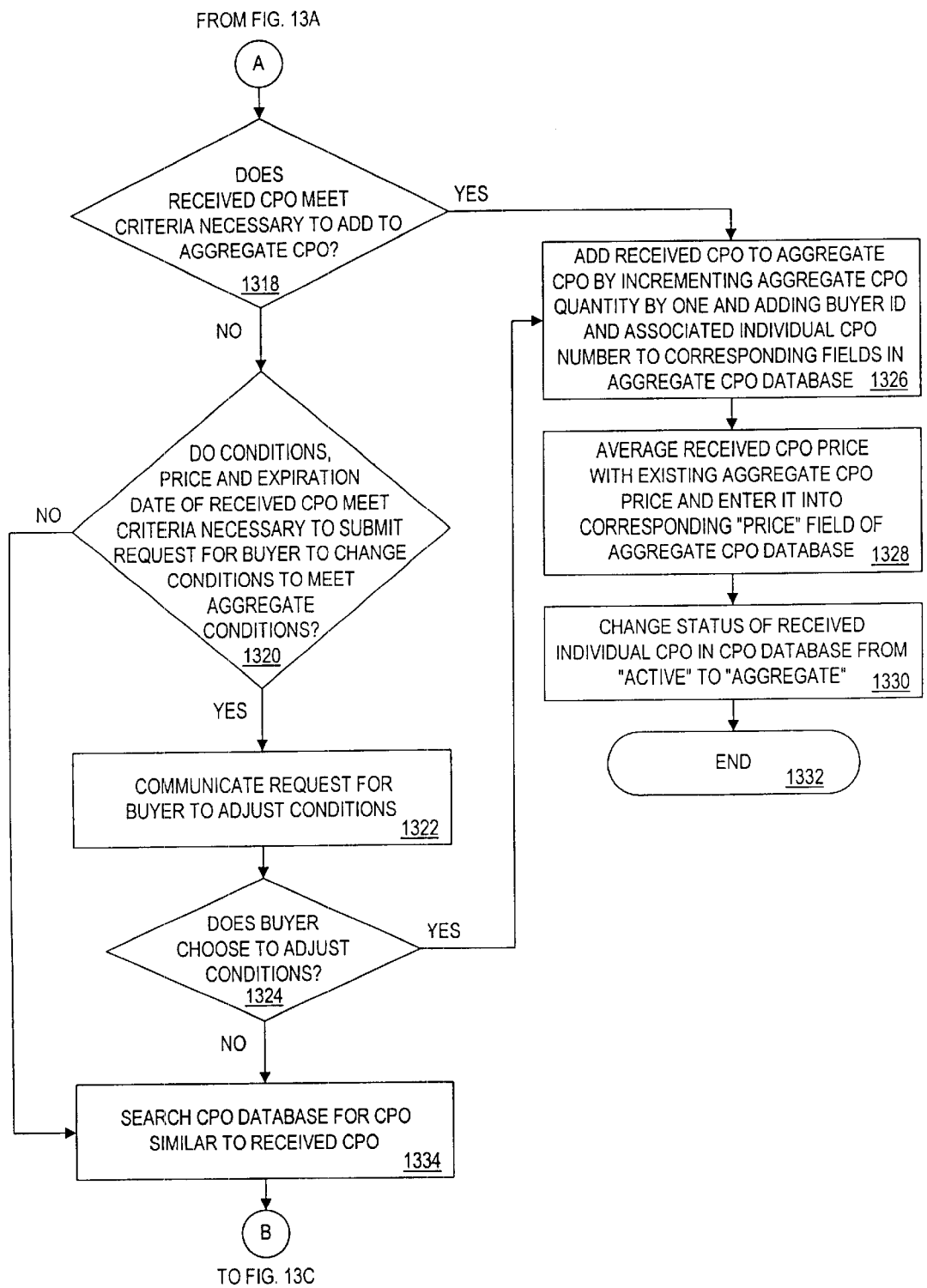
Figure 13C:
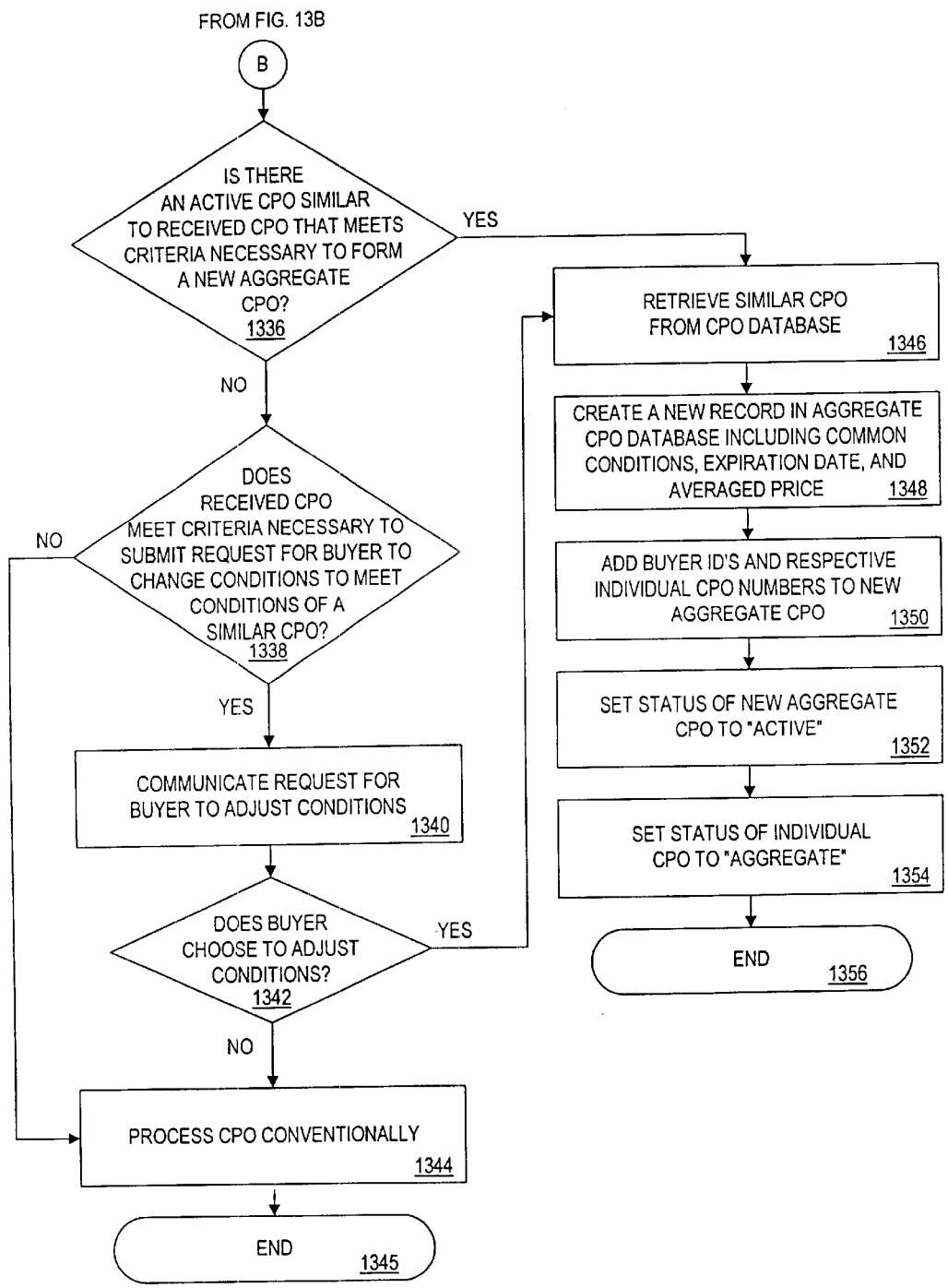
Figure 14A:
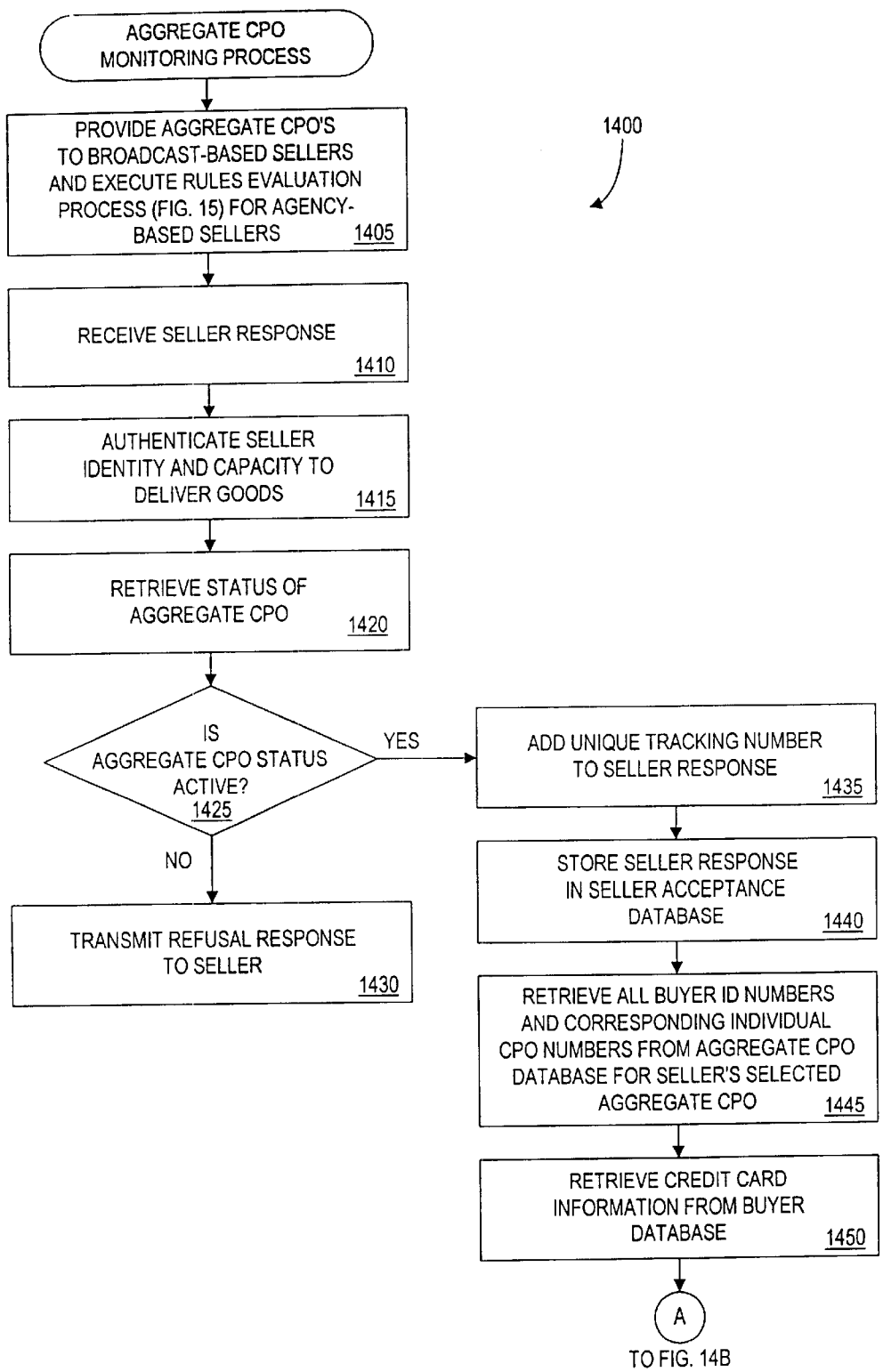
FIGS. 14a and 14b, collectively, are a flowchart describing an exemplary aggregate CPO monitoring process implemented by the central controller of FIG. 2.
Figure 14B:
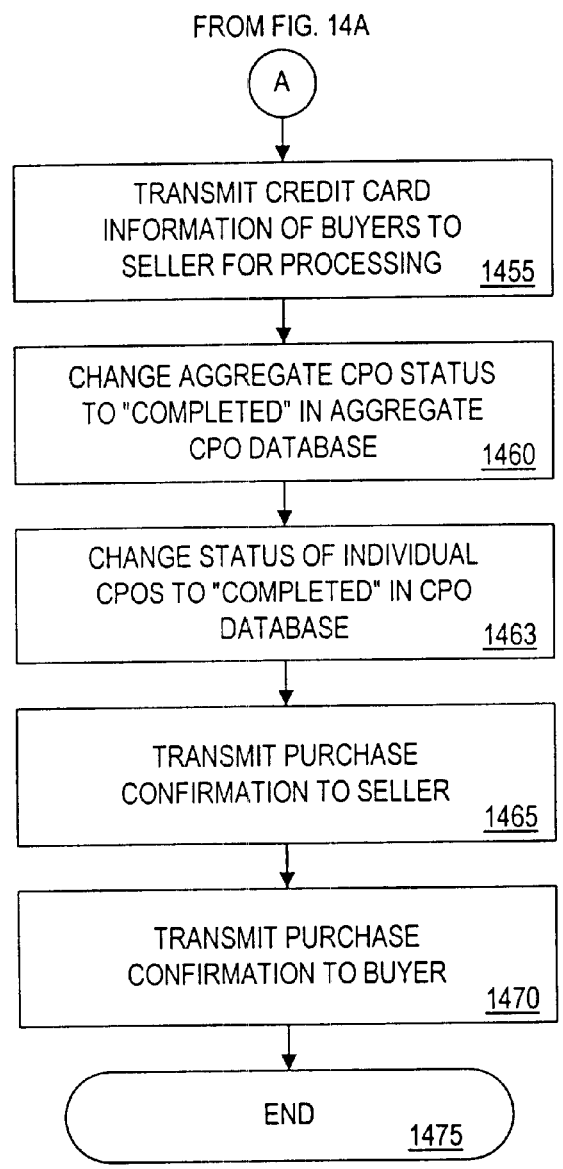

As discussed above, the central controller 200 preferably executes a CPO aggregation process 1300, shown in FIGS. 13a through 13c, to receive a CPO from a buyer and to determine whether the CPO should be (i) included with a pending aggregate CPO, (ii) included with one or more pending CPOs to form a new aggregate CPO, or (iii) processed independently. As illustrated in FIG. 13a, the CPO aggregation process 1300 begins the processes embodying the principles of the present invention during step 1302, when a buyer submits a CPO for certain described goods or services.

Thereafter, the central controller 200 will receive the conditions, price and expiration date associated with the CPO from the buyer, including a description of each good or service, and an identifier of a general purpose account from which funds may be paid, such as a credit or debit card account, during step 1304. It is noted that if the buyer ultimately fails to purchase the requested item once the CPO is accepted by a seller, the buyer can be charged a fee or a penalty. In this manner, the offer is guaranteed with a general purpose account, for example, using a line of credit on a credit card account. Appropriate legal language is preferably displayed or read to the buyer during step 1306 to form a binding CPO. A CPO number is generated during step 1308, and the CPO information, including a buyer identifier, CPO price and expiration date, and subject and conditions for the goods or services, are then entered into the CPO database 700 during step 1310. The status of the individual CPO is then set to "active" in field 765 of the CPO database 700 during step 1312.

The aggregation rules are then retrieved from the aggregation rules database 800 during step 1314, and the aggregate CPO database 900 is then searched during step 1316 for active aggregate CPOs that are similar to the received individual CPO. Thereafter, a test is performed during step 1318 (FIG. 13*b*) to determine if the received CPO meets the criteria specified in record 805 of the aggregation rules database 800 to add the individual received CPO to a pending aggregate CPO. Specifically, in the illustrative embodiment, the CPO aggregation process 1300 will determine if (i) the buyer's CPO price is at least eighty percent (80%) of a given aggregate CPO price; (ii) the buyer's conditions meet the conditions of the given aggregate CPO; and (iii) the received CPO expires on or after the expiration date of the given aggregate CPO.

If it is determined during step 1318 that the received CPO meets the criteria necessary to add the individual received CPO to a pending aggregate CPO, then the received CPO is added to the aggregate CPO during step 1326 by incrementing the aggregate CPO quantity in field 960 of the aggregate CPO database 900 by one (1) and by adding the buyer identifier associated with the received CPO, as well as the individual CPO identifier, to fields 965 and 970 of the aggregate CPO database 900. Thereafter, during step 1328, the price of the received CPO is averaged with the price of the existing aggregate CPO and the averaged price is entered into field 945 of the aggregate CPO database 900. The status of the received individual CPO is then changed from "active" to "aggregate" in the CPO database 700, during step 1330 indicating that the individual CPO is now part of an aggregate CPO. It is noted that the individual CPO can preferably be individually accepted by one or more sellers, even if it is included in an aggregate CPO. Thereafter, program control terminates during step 1332.

If, however, it is determined during step 1318 that the received CPO does not meet the criteria necessary to add the individual received CPO to a pending aggregate CPO, then a further test is performed during step 1320 to determine if the conditions, price and expiration date of received CPO meet the criteria in record 810 of the aggregation rules database 800 to submit a request to the buyer to modify the conditions to meet the conditions of a pending aggregate CPO. Specifically, in the illustrative embodiment, the CPO aggregation process 1300 will determine if (i) the buyer's CPO price is at least seventy percent (70%) of a given aggregate CPO price; (ii) the buyer's conditions meet at least seventy five percent (75%) of the conditions of the given aggregate CPO; and (iii) the received CPO must not expire more than three (3) days earlier than the expiration date of the given aggregate CPO.

If it is determined during step 1320 that the conditions, price and expiration date of received CPO meet the criteria necessary to submit a request to the buyer to modify the conditions to meet the conditions of a pending aggregate CPO, then the request is communicated to the buyer during step 1322. A test is then performed during step 1324 to determine if the buyer agrees to modify the conditions. If it is determined during step 1324 that the buyer agrees to modify the conditions, then program control proceeds to step 1326 to add the individual CPO to the pending aggregate CPO in the manner described above.

If, however, it is determined during step 1320 that the conditions, price and expiration date of received CPO do not meet the criteria necessary to submit a request to the buyer to modify the conditions to meet the conditions of a pending aggregate CPO, or if it is determined during step 1324 that the buyer does not agree to modify the conditions, then the CPO database 700 is searched during step 1334 for pending individual CPOs that are similar to the received CPO.

Thereafter, a test is performed during step 1336 (FIG. 13*c*) to determine if there are one or more active individual CPOs similar to the received CPO that meet the criteria specified in record 815 of the aggregation rules database 800 to form a new aggregate CPO including the received CPO and the one or more existing individual CPOs. Specifically, in the illustrative embodiment, the CPO aggregation process 1300 will determine if (i) the buyer's CPO price is at least eighty percent (80%) of the existing CPO price; (ii) the buyer's conditions meet the conditions of the existing CPO; and (iii) the received CPO expires on or after the expiration date of the given existing CPO.

If it is determined during step 1336 that there are one or more active individual CPOs similar to the received CPO that meet for forming a new aggregate CPO, then the similar existing CPO is retrieved from the CPO database 700 during step 1346, and a new record is created in the aggregate CPO database 900 during step 1348, including the common conditions, expiration date and averaged price. The buyer identifiers associated with the received CPO and the existing CPO, as well as the respective individual CPO numbers, are entered during step 1350 into the record created in the aggregate CPO database 900 during the previous step. Finally, the status of the new aggregate CPO is set to "active" and the status of each respective individual CPO is set to "aggregate" during steps 1352 and 1354, respectively, before program control terminates during step 1356.

If, however, it is determined during step 1336 that there are not one or more active individual CPOs similar to the received CPO that meet for forming a new aggregate CPO, then a further test is performed during step 1338 to determine if the received CPO meets the criteria specified in record 820 of the aggregation rules database 800 to submit a request to the buyer to modify the original conditions of the CPO to meet the conditions of an existing CPO. Specifically, in the illustrative embodiment, the CPO aggregation process 1300 will determine if (i) the buyer's CPO price is at least seventy percent (70%) of the existing CPO price; (ii) the buyer's conditions meet at least seventy five percent (75%) of the conditions of the existing CPO; and (iii) the received CPO must not expire more than three (3) days earlier than the given existing CPO.

It it is determined during step 1338 that that the received CPO does not meet the criteria to submit a request to the buyer to modify the original conditions of the CPO to meet the conditions of an existing CPO, then program control proceeds to step 1344, discussed below, to process the received CPO individually in a conventional manner. If, however, it is determined during step 1338 that that the received CPO does meet the criteria to submit a request to the buyer to modify the original conditions of the CPO to meet the conditions of an existing CPO, then the request is communicated to the buyer to adjust the conditions during step 1340. Thereafter, a test is performed during step 1342 to determine if the buyer has agreed to modify the original conditions of the CPO.

If it is determined during step 1342 that the buyer has agreed to modify the original conditions of the CPO, then program control proceeds to step 1346 to aggregate the modified received CPO with an existing CPO, in the manner described above. If, however, it is determined during step 1342 that the buyer has not agreed to modify the original conditions of the CPO, then program control proceeds to step 1344, to process the original received CPO individually in a conventional manner. Thereafter, program control terminates during step 1345.

As previously indicated, the central controller 200 preferably executes an aggregate CPO monitoring process 1400, shown in FIG. 14, to (i) provide each CPO to the appropriate broadcast-based sellers and (ii) evaluate each CPO against the appropriate CPO rules of each appropriate agency-based seller. In addition, once the CPOs have been posted, the aggregate CPO monitoring process 1400 will preferably monitor each CPO to determine if it is accepted by an appropriate seller. The aggregate CPO monitoring process 1400 initially provides each aggregate CPO to each broadcast-based seller and executes the CPO rule evaluation process 1500 (FIG. 15) for each agency-based seller during step 1405.

Thereafter, the response of each accepting seller is received during step 1410. The seller, and the seller's ability to deliver the specified goods or services, is then authenticated during step 1415. The status of the accepted aggregate CPO is then retrieved during step 1420, before a test is performed during step 1425 to confirm that the status of the accepted aggregate CPO is still "active." If it is determined during step 1425 that the status of the accepted aggregate CPO is no longer "active," then a refusal response or other rejection is transmitted to the seller during step 1430. In other words, a seller may accept an aggregate CPO that has since expired, or has already been accepted by another seller.

If, however, it is determined during step 1425 that the status of the accepted aggregate CPO is still "active," then a unique tracking number is preferably added to the seller response during step 1435, and the seller response is then stored in the seller response database 1100 during step 1440. Each of the buyer identifiers and corresponding individual CPO numbers included in the accepted aggregate CPO are retrieved from the aggregate CPO database 900 during step 1445.

The corresponding credit card information, or an identifier of another general purpose account, for each buyer is preferably retrieved from the buyer database 500 during step 1450, and then transmitted to the accepting seller during step 1455 (FIG. 14b) for payment processing. The status of the aggregate CPO in the aggregate CPO database 900 is changed from "active" to "completed" during step 1460. The status of the individual CPOs are then changed to "completed" during step 1463 in the CPO database. Purchase confirmations are then preferably transmitted to the accepting seller and each corresponding buyer during steps 1465 and 1470, respectively, before program control terminates during step 1475.

Figure 15:
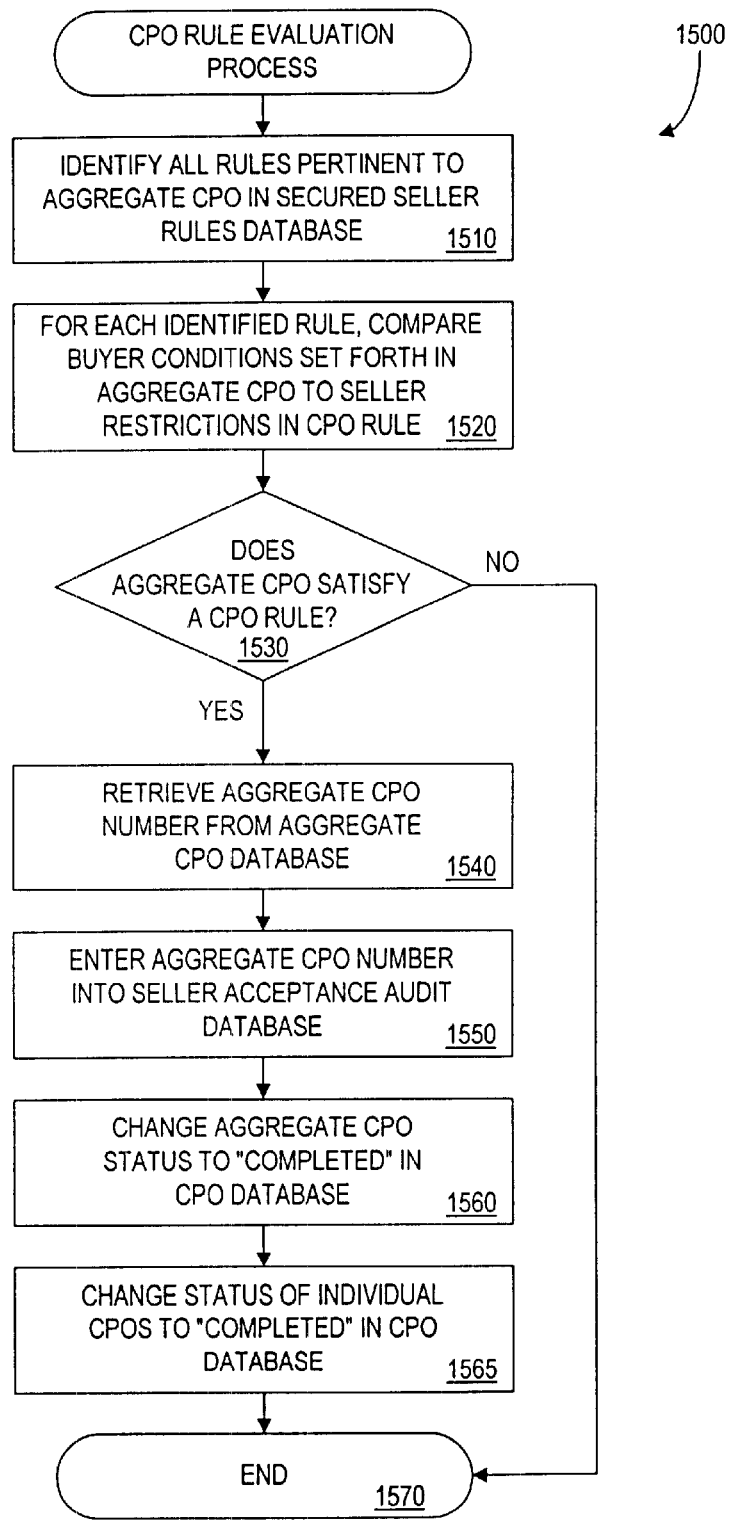
FIG. 15 is a flow chart describing an exemplary CPO rule evaluation process implemented by the secured server of FIG. 3.

As discussed above, the aggregate CPO monitoring process 1400 preferably executes the CPO rule evaluation process 1500 during step 1405 to compare a given CPO against the rules of one or more agency-based sellers to generate a response on behalf of the sellers to the given CPO. As shown in FIG. 15, the CPO rule evaluation process 1500 initially identifies all CPO rules in the secured seller rules database 1200 which are pertinent to the aggregate CPO during step 1510. Thereafter, during step 1520, the buyer-defined conditions from the CPO record in the CPO database 700 are compared to the corresponding seller defined restrictions from the secured seller rules database 1200 during step 1520, for each CPO rule identified during the previous step.

Thereafter, a test is performed during step 1530 to determine if the CPO satisfies a CPO rule. If it is determined during step 1530 that the aggregate CPO does not satisfy one CPO rule, then program control terminates during step 1570. If, however, it is determined during step 1530 that the aggregate CPO does satisfy a CPO rule, then the CPO number is retrieved from the CPO database 700 during step 1540, and then entered into the seller response database 1100 during step 1550. Likewise, the status of the aggregate CPO in the field 935 of the aggregate CPO database package CPO counteroffer database 900 is updated to "completed" during step 1560. The status of the individual CPO in field 765 of the CPO database 700 is updated to "completed" during step 1565, before program control terminates during step 1570.

It is to be understood that the embodiments and variations shown and described herein are merely illustrative of the principles of this invention and that various modifications may be implemented by those skilled in the art without departing from the scope and spirit of the invention.

We claim:

1. A method of processing the sale an item, comprising the steps of:

obtaining an individual purchase offer for said item from each of at least two customers, each of said individual purchase offers containing a description of said item and a payment identifier for specifying a general-purpose account from which funds may be paid;

combining said individual purchase offers to form an aggregate purchase offer;

providing said aggregate purchase offer to one or more potential sellers;

receiving from at least one of said sellers an acceptance of said aggregate purchase offer; and binding said customers to purchase said item if an acceptance is received for said aggregate purchase offer.

2. The method according to claim 1, further comprising the step of initiating the use of said payment identifiers to collect said funds from each of said customers.

3. The method according to claim 1, wherein said individual purchase offers include a price and said aggregate purchase offer has a unit cost equal to an average of said prices.

4. The method according to claim 1, wherein said individual purchase offers include a price and said aggregate purchase offer has a price equal to the total of said prices of said individual purchase offers.

5. The method according to claim 1, further comprising the step of providing said aggregate purchase offer to said sellers based on the industry associated with said aggregate purchase offer and the industry of said sellers.

6. The method according to claim 1, further comprising the step of providing one or more of said individual purchase offers to said potential sellers with said aggregate purchase offer.

7. The method according to claim 1, wherein said combining step is performed in accordance with aggregation rules.

8. The method according to claim 7, wherein said aggregation rules require that the terms of each of said individual purchase offers are within predefined tolerances of each other, in order to form said aggregate purchase offer.

9. The method according to claim 1, further comprising the step of providing existing aggregate purchase offers to said customers to review prior to said obtaining step.

10. The method according to claim 9, further comprising the step of obtaining a request from at least one of said customers to include said individual purchase offer of said customer in one of said existing aggregate purchase offers.

11. The method according to claim 1, further comprising the step of requesting at least one of said customers to modify said individual purchase offer of said customer to conform said individual purchase offer to an existing aggregate purchase offer.

12. The method according to claim 1, further comprising the step of requesting at least one of said customers to modify said individual purchase offer of said customer to conform said individual purchase offer to a purchase offer from another of said customers.

13. A method of processing the sale of an item, comprising the steps of:
    obtaining an individual purchase offer for said item from each of at least two customers, each of said individual purchase offers containing at least one customer-defined condition;
    combining said individual purchase offers to form an aggregate purchase offer;
    identifying one or more rules from at least one potential sellers of said item, each of said rules containing one or more seller-defined restrictions;
    comparing said aggregate purchase offer to said rules to determine whether any of said sellers is willing to accept said aggregate purchase offer if said customer-defined condition satisfies said seller-defined restrictions of at least one of said rules; and
    providing said item to said customers if an acceptance is obtained for said aggregate purchase offer.

14. The method according to claim 13, wherein said individual purchase offers further contain a payment identifier for specifying a general-purpose account from which funds may be paid and said method further comprises the step of initiating the use of said payment identifiers to collect said funds from each of said customers.

15. The method according to claim 13, wherein said individual purchase offers include a price and said aggregate purchase offer has a unit cost equal to an average of said prices.

16. The method according to claim 13, wherein said individual purchase offers include a price and said aggregate purchase offer has a price equal to the total of said prices of said individual purchase offers.

17. The method according to claim 13, further comprising the step of comparing one or more of said individual purchase offers to said rules concurrently with said aggregate purchase offer.

18. The method according to claim 13, wherein said combining step is performed in accordance with aggregation rules.

19. The method according to claim 18, wherein said aggregation rules require that the terms of each of said individual purchase offers are within predefined tolerances of each other, in order to form said aggregate purchase offer.

20. A method of processing the sale of an item, comprising the steps of:
    obtaining an individual purchase offer for said item from each of at least two customers, each of said individual purchase offers containing at least one customer-defined condition for said item and a total price;
    combining said individual purchase offers to form an aggregate purchase offer;
    providing said aggregate purchase offer to one or more potential sellers;
    receiving from one or more of said sellers an acceptance of said aggregate purchase offer at a price and an identification of a product satisfying said customer-defined condition; and
    binding said customer to purchase said product if an acceptance is received for said aggregate purchase offer.

21. The method according to claim 20, wherein said individual purchase offers further contain a payment identifier for specifying a general-purpose account from which funds may be paid and said method further comprises the step of initiating the use of said payment identifiers to collect said funds.

22. The method according to claim 20, wherein said individual purchase offers include a price and said aggregate purchase offer has a unit cost equal to an average of said prices.

23. The method according to claim 20, wherein said individual purchase offers include a price and said aggregate purchase offer has a price equal to the total of said prices of said individual purchase offers.

24. The method according to claim 20, wherein said combining step ensures that the terms of each of said individual purchase offers are within predefined tolerances of each other, in order to form said aggregate purchase offer.

25. The method according to claim 20, further comprising the step of requesting at least one of said customers to modify said individual purchase offer of said customer to conform said individual purchase offer to an existing aggregate purchase offer.

26. The method according to claim 20, further comprising the step of requesting at least one of said customers to modify said individual purchase offer of said customer to conform said individual purchase offer to an individual purchase offer from another of said customers.

27. A system for processing the sale of an item comprising:
    one or more communications ports to receive an individual purchase offer for said item from each of at least two customers, each of said individual purchase offers containing a description of said item and a payment identifier for specifying a general-purpose account from which funds may be paid; and
    one or more processors to combine said individual purchase offers into an aggregate purchase offer and to determine if said aggregate purchase offer is accepted by one or more potential sellers and thereby bind said customer to purchase said item if an acceptance is received for said aggregate purchase offer.

28. A system for processing the sale of an item comprising:
    one or more communications ports for obtaining an individual purchase offer for said item from each of at least two customers and for obtaining one or more rules from at least one seller of said item, each of said individual purchase offers containing at least one customer-defined condition for said item and each of said rules containing one or more seller-defined restrictions; and one or more processors to:
- combine said individual purchase offers into an aggregate purchase offer;
- compare said aggregate purchase offer to said rules to determine whether a seller is willing to accept said aggregate purchase offer if said customer-defined condition satisfies said seller-defined restrictions of at least one of said rules; and
- provide said item to said customers if an acceptance is obtained for said aggregate purchase offer.

29. A method of processing the sale of insurance policies, comprising the steps of:
- obtaining an individual purchase offer for an insurance policy from each of at least two customers, each of said individual purchase offers containing a description of said insurance policy and payment identifier for specifying a general-purpose account from which funds may be paid;
- combining said individual purchase offers to form an aggregate purchase offer;
- obtaining a risk evaluation associated with said aggregate purchase offer;
- providing said aggregate purchase offer and said risk evaluation to one or more potential insurance carriers,
- receiving from at least one of said sellers an acceptance of said aggregate purchase offer; and
- binding said customers to purchase said insurance policy if an acceptance is received for said aggregate purchase offer.

30. The method according to claim 29, wherein said step of combining said individual purchase offers to form an aggregate purchase offer assembles a group of said customers having a desired demographic composition.

31. The method according to claim 29, further comprising the step of excluding personal information from said aggregate purchase offer until said aggregate purchase offer is accepted.

32. A method of processing the sale an item, comprising the steps of:
- obtaining an individual purchase offer for said item from each of at least two customers, each of said individual purchase offers containing a description of said item and a payment identifier for specifying a general-purpose account from which funds may be paid;
- combining said individual purchase offers to form a plurality of aggregate purchase offers;
- providing said aggregate purchase offers to one or more potential sellers;
- recieving from at least one of said sellers an acceptance of an accepted aggregate purchase offers;
- binding said customers to purchase said item if an acceptance is received for said aggregate purchase offer; and
- removing said individual purchase offers included in said accepted aggregate purchase offer from each of said additional aggregate purchase offers.

* * * * *

UNITED STATES PATENT AND TRADEMARK OFFICE
CERTIFICATE OF CORRECTION

PATENT NO.     : 6,418,415 B1
DATED          : July 9, 2002
INVENTOR(S)    : Jay S. Walker et al.

It is certified that error appears in the above-identified patent and that said Letters Patent is hereby corrected as shown below:

<u>Title page,</u>
Item [56], References Cited, OTHER PUBLICATION, please add the following references
-- McGee, "Airlines Go That extra Mile To Win Group Business", 1987, pp.--
-- Lee et al., "A Generalized Quantity Discount Pricing Model To Increase supplier's Profit", 1984, pp. 3-11 --
-- Outlook : Most Buyers Can't see past June", 3/1996, pp 20-22 --

Figure 11:
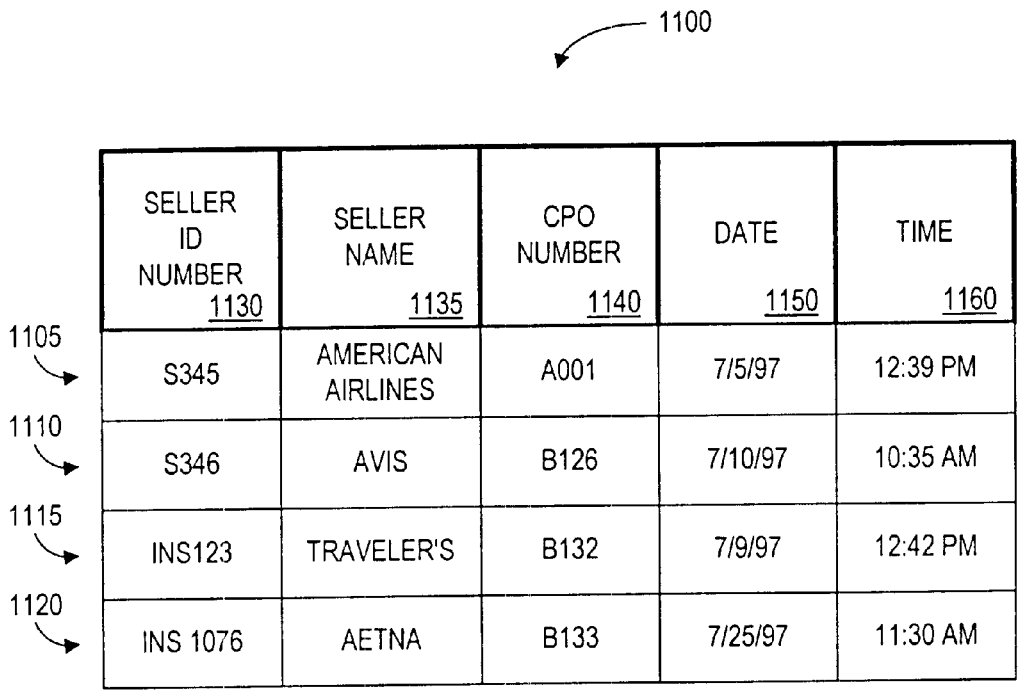
FIG. 11 illustrates a sample table from the seller acceptance audit database of FIG. 2.

<u>Column 12,</u>
Line 24, please delete "FIG. 10" and insert therefor -- FIG. 11 --.

Signed and Sealed this

Seventeenth Day of December, 2002

JAMES E. ROGAN
*Director of the United States Patent and Trademark Office*